United States Patent
Cheng et al.

(10) Patent No.: US 11,115,967 B2
(45) Date of Patent: Sep. 7, 2021

(54) METHOD AND APPARATUS FOR HANDLING EMBB AND URLLC SIMULTANEOUS TRANSMISSIONS

(71) Applicant: FG Innovation Company Limited, New Territories (CN)

(72) Inventors: Yu-Hsin Cheng, Hsinchu (TW); Chie-Ming Chou, Hsinchu (TW); Chien-Chun Cheng, Taipei (TW)

(73) Assignee: FG INNOVATION COMPANY LIMITED, New Territories (CN)

( * ) Notice: Subject to any disclaimer, the term of this patent is extended or adjusted under 35 U.S.C. 154(b) by 0 days.

(21) Appl. No.: 16/433,327

(22) Filed: Jun. 6, 2019

(65) Prior Publication Data

US 2019/0394758 A1    Dec. 26, 2019

Related U.S. Application Data

(60) Provisional application No. 62/687,302, filed on Jun. 20, 2018.

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0004* (2013.01); *H04L 1/0026* (2013.01);
(Continued)

(58) Field of Classification Search
CPC ........... H04W 72/042; H04W 72/0446; H04W 72/1289; H04L 5/0053; H04L 5/0007
See application file for complete search history.

(56) References Cited

U.S. PATENT DOCUMENTS

2019/0068346 A1*  2/2019  Akkarakaran ...... H04W 72/042
2019/0159219 A1*  5/2019  Hosseini ............. H04B 7/0628
(Continued)

FOREIGN PATENT DOCUMENTS

| CN | 108111281 A | 6/2015 |
| WO | 2018064128 A1 | 4/2015 |
| WO | 2017195702 A1 | 11/2017 |

OTHER PUBLICATIONS

Patent Cooperation Treaty; "International Search Report from PCT Application No. PCT/CN2019/090028 dated Sep. 10, 2019"; from Foreign Counterpart of U.S. Appl. No. 16/433,327; pp. 4; Published: CN.

(Continued)

*Primary Examiner* — Jung H Park
(74) *Attorney, Agent, or Firm* — Polsinelli PC

(57) ABSTRACT

Techniques are described for handling enhanced Mobile Broadband (eMBB) and Ultra Reliable Low Latency Communication (URLLC) simultaneous transmissions. For example, based on received downlink control information (DCI), user equipment (UE) can determine one or more behaviors to perform based on whether the DCI is related an enhanced mobile broadband (eMBB) service and/or an ultra-reliable low-latency communication (URLLC) service. The behaviors performed when the DCI is related to the eMBB service can be different than the behaviors performed when the DCI is related to the URLLC service.

14 Claims, 21 Drawing Sheets

(51) Int. Cl.
*H04W 76/27* (2018.01)
*H04W 76/11* (2018.01)
*H04W 24/08* (2009.01)
*H04L 1/18* (2006.01)
*H04L 5/00* (2006.01)
*H04L 1/20* (2006.01)

(52) U.S. Cl.
CPC .......... *H04L 1/0061* (2013.01); *H04L 1/1819* (2013.01); *H04L 1/203* (2013.01); *H04L 5/0055* (2013.01); *H04W 24/08* (2013.01); *H04W 72/0413* (2013.01); *H04W 72/0466* (2013.01); *H04W 76/11* (2018.02); *H04W 76/27* (2018.02)

(56) References Cited

U.S. PATENT DOCUMENTS

| | | | |
|---|---|---|---|
| 2019/0349897 A1* | 11/2019 | Hosseini | H04W 72/048 |
| 2019/0349941 A1* | 11/2019 | Yang | H04L 1/1893 |
| 2019/0349973 A1* | 11/2019 | Yang | H04W 72/1257 |
| 2020/0008216 A1* | 1/2020 | Iyer | H04W 72/1242 |
| 2020/0052861 A1* | 2/2020 | Li | H04W 72/0413 |
| 2020/0120645 A1* | 4/2020 | Park | H04W 72/1289 |
| 2020/0136763 A1* | 4/2020 | Lee | H04W 28/04 |
| 2020/0146032 A1* | 5/2020 | Bae | H04W 72/042 |
| 2021/0022129 A1* | 1/2021 | Yuan | H04L 5/0055 |

OTHER PUBLICATIONS

VIVO Discussion on DCI format for URLLC 3 GPP TSG RAN WGI Meeting #93 RI-1806059; May 25, 2018; pp. 7.

\* cited by examiner

```
CSI-AperiodicTriggerStateList
  - CSI-AperiodicTriggerState
    - CSI-AssociatedReportConfigInfo
      - nzp-CSI-RS-Config#4
      - CSI-reportConfig#1
        - CQI table : 0
        ⋮
  - CSI-AperiodicTriggerState
    - CSI-AssociatedReportConfigInfo
      - nzp-CSI-RS-Config#3
      - CSI-reportConfig#2
        - CQI table : 1
        ⋮
  - CSI-AperiodicTriggerState
    - CSI-AssociatedReportConfigInfo
      - nzp-CSI-RS-Config#2
      - CSI-reportConfig#3
        - CQI table : 0
        ⋮
  - CSI-AperiodicTriggerState
    - CSI-AssociatedReportConfigInfo
      - nzp-CSI-RS-Config#1
      - CSI-reportConfig#4
        - CQI table : 0
        ⋮
```

FIG. 5

- CSI-reportConfig#3
  - CQI table : 0
  - reportQuantity : CQI/PMI/LI/RI/CRI
  - codebookConfig
    - rank restriction : allow 5/6/7/8
      ⋮

FIG. 6

```
- UCI-on-PUSCH
  - beta-offsets
    - dynamic
      - betaoffsets
        - beta offset ID#1
        - beta offset ID#3
        - beta offset ID#4
        - beta offset ID#5
      - betaoffsets-urllc
        - beta offset ID#5
        - beta offset ID#8
        - beta offset ID#10
        - beta offset ID#11
```

FIG. 8

- CSI-reportConfig#3
  - CQI table : 0
  - reportQuantity : CQI/PMI/LI/RI/CRI
  - PUCCH-CSI-Resource
    - PUCCH resource#3
  - reportConfigType : periodic
  - ...

- CSI-reportConfig#4
  - CQI table : 1
  - reportQuantity : CQI/PMI/LI/RI/CRI
  - PUCCH-CSI-Resource
    - PUCCH resource#4
  - reportConfigType : semi-persistent
  - ...

- PUCCH-config
  - multi-CSI-PUCCH-ResourceList
    - PUCCH resource #12
      - format : format2
      - nrofPRBs : 10 RBs
      - nrofSymbols : 1 symbol
    - ...
    - PUCCH resource #13
      - format : format3
      - nrofPRBs : 10 RBs
      - nrofSymbols : 8 symbols
    - ...

FIG. 10

- PUCCH-ResourceSet #0
  - resourceList
    - PUCCH resource #10
    - PUCCH resource #11
    - PUCCH resource #12
    - PUCCH resource #13
    - PUCCH resource #14
    - PUCCH resource #15
    - PUCCH resource #16
    - PUCCH resource #17
  - maxPayloadMinus1 : 4

- PUCCH-ResourceSet #1
  - resourceList
    - PUCCH resource #18
      - format : format2
    - PUCCH resource #19
      - format : format3
    - PUCCH resource #20
    - PUCCH resource #21
    - PUCCH resource #22
    - PUCCH resource #23
    - PUCCH resource #24
    - PUCCH resource #25
  - maxPayloadMinus1 : 60

- PUCCH-ResourceSet #2
  - resourceList
    - PUCCH resource #26
      - format : format3
    - PUCCH resource #27
      - format : format3
    - PUCCH resource #28
    - PUCCH resource #29
    - PUCCH resource #30
    - PUCCH resource #31
    - PUCCH resource #32
    - PUCCH resource #33
  - maxPayloadMinus1 : 256

FIG. 12

| MCS Index $I_{MCS}$ | Modulation Order $Q_m$ | Code rate $R$ × 1024 | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 13

| MCS Index $I_{MCS}$ | Modulation Order $Q_m$ | Target code Rate $R \times [1024]$ | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 14

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 15

| Scheduled MCS | Time density ($L_{PT-RS}$) |
|---|---|
| $I_{MCS}$ < ptrs-MCS₁ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

FIG. 16

| Scheduled bandwidth | Frequency density ($K_{PT-RS}$) |
|---|---|
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

FIG. 17

```
- DL-PTRSConfig
  - timeDensity
    - ptrs-MCS1 : 12
    - ptrs-MCS2 : 20
    - ptrs-MCS3 : 28
  - timeDensity
    - ptrs-MCS1-URLLC : 10
    - ptrs-MCS2-URLLC : 14
    - ptrs-MCS3-URLLC : 18
         ⋮
```

FIG. 19

METHOD AND APPARATUS FOR HANDLING EMBB AND URLLC SIMULTANEOUS TRANSMISSIONS

CROSS-REFERENCES TO RELATED APPLICATIONS

This application claims the benefit of U.S. Provisional Patent No. 62/687,302, filed Jun. 20, 2018, the contents of which are hereby incorporated by reference in their entirety.

FIELD

This application is generally related to 5G technology. For example, aspects of this application relate to handling enhanced Mobile Broadband (eMBB) and Ultra Reliable Low Latency Communication (URLLC) simultaneous transmissions.

BACKGROUND

5G New Radio (NR) Access Technology was approved by the 3GPP standards body at its 71$^{st}$ Plenary. The 5G NR scheme includes the eMBB service and the URLLC service. eMBB provides greater data bandwidth as compared to previous implementations, and also delivers latency improvements and a wide coverage area. These improvements complement many high bandwidth applications, such as virtual reality, augmented reality, streaming video, real-time translation, and more. URLLC is another important use case of 5G NR. URLLC has strict requirements for latency and reliability in order to support the most critical communications. A goal of URLLC is to meet the performance requirements set forth in Technical Report (TR) 38.913.

URLLC transmission may be used to achieve high reliability and low latency in a wireless network. During simultaneous transmission of URLLC and eMBB service, some configurations for eMBB service can be used by URLLC service. However, the latency and reliability requirements may be different between the URLLC service and the eMBB service. In addition, the parameters for eMBB service may not fulfill URLLC service.

SUMMARY

Aspects of this application introduce methods, apparatuses, and computer-readable media for handling eMBB and URLLC simultaneous transmissions. Such aspects can ensure the performance requirements of the URLLC service are met. For example, based on received downlink control information (DCI), user equipment (UE) can determine one or more behaviors to perform based on whether the DCI is related an enhanced mobile broadband (eMBB) service and/or an ultra-reliable low-latency communication (URLLC) service. The behaviors performed when the DCI is related to the eMBB service can be different than the behaviors performed when the DCI is related to the URLLC service. The one or more behaviors can include applying a certain phase tracking reference signal (PTRS) parameter, applying a certain a first beta offset, generating at least a portion of a joint channel state information (CSI) report for the eMBB service and/or at least a portion of the joint CSI report for the URLLC service, performing uplink control information (UCI) multiplexing according to a physical uplink control channel (PUCCH) format, and/or dropping UCI of a CSI report for the eMBB service based on whether the DCI is related to the eMBB service or the URLLC service.

According to at least one example, a method of applying one or more behaviors based on one or more services is provided, which can handle eMBB and URLLC simultaneous transmissions. The method comprises receiving, at user equipment, DCI. The method further comprises applying a first behavior based on determining a resource allocation associated with the DCI is for an eMBB service. Applying the first behavior includes at least one of applying a first PTRS parameter, applying a first beta offset, or generating at least a portion of a joint CSI report for the eMBB service. The method further comprises applying a second behavior based on determining the resource allocation associated with the DCI is for a URLLC service. Applying the second behavior includes at least one of applying a second PTRS parameter, applying a second beta offset, performing UCI multiplexing according to a PUCCH format, dropping UCI of a CSI report for the eMBB service, or generating at least a portion of the joint CSI report for the URLLC service.

In another example, an apparatus for applying one or more behaviors based on one or more services is provided. The apparatus includes a memory configured to store downlink control information (DCI), and a processor coupled to the memory. The processor can be implemented in circuitry. The processor is configured to perform steps including receiving, at user equipment, the DCI. The steps further include applying a first behavior based on determining a resource allocation associated with the DCI is for an eMBB service. Applying the first behavior includes at least one of applying a first PTRS parameter, applying a first beta offset, or generating at least a portion of a joint CSI report for the eMBB service. The steps further include applying a second behavior based on determining the resource allocation associated with the DCI is for a URLLC service. Applying the second behavior includes at least one of applying a second PTRS parameter, applying a second beta offset, performing UCI multiplexing according to a PUCCH format, dropping UCI of a CSI report for the eMBB service, or generating at least a portion of the joint CSI report for the URLLC service.

In another example, a non-transitory computer-readable medium is provided having stored thereon instructions that, when executed by one or more processors, cause the one or more processor to: receive, at user equipment, DCI; apply a first behavior based on determining a resource allocation associated with the DCI is for an enhanced mobile broadband (eMBB) service, wherein applying the first behavior includes at least one of applying a first phase tracking reference signal (PTRS) parameter, applying a first beta offset, or generating at least a portion of a joint channel state information (CSI) report for the eMBB service; and applying a second behavior based on determining the resource allocation associated with the DCI is for an ultra-reliable low-latency communication (URLLC) service, wherein applying the second behavior includes at least one of applying a second PTRS parameter, applying a second beta offset, performing uplink control information (UCI) multiplexing according to a physical uplink control channel (PUCCH) format, dropping UCI of a CSI report for the eMBB service, or generating at least a portion of the joint CSI report for the URLLC service.

In another example, an apparatus for applying one or more behaviors based on one or more services is provided. The apparatus comprises means for receiving, at user equipment, DCI. The apparatus further comprises means for applying a first behavior based on determining a resource allocation associated with the DCI is for an eMBB service. Applying the first behavior includes at least one of applying a first PTRS parameter, applying a first beta offset, or generating at least a portion of a joint CSI report for the eMBB service. The apparatus further comprises means for applying a second behavior based on determining the resource allocation associated with the DCI is for a URLLC service. Applying the second behavior includes at least one of applying a second PTRS parameter, applying a second beta offset, performing UCI multiplexing according to a PUCCH format, dropping UCI of a CSI report for the eMBB service, or generating at least a portion of the joint CSI report for the URLLC service.

In some aspects, the eMBB service and the URLLC service are used simultaneously by the user equipment.

In some aspects, determining the resource allocation associated with the DCI is for the URLLC service includes determining that one or more CRC bits of the DCI are scrambled with a radio network temporary identifier (RNTI).

In some aspects, determining the resource allocation associated with the DCI is for the URLLC service includes determining that a DCI format associated with the DCI has less bits than one or more DCI formats used for the eMBB service.

In some aspects, determining the resource allocation associated with the DCI is for the URLLC service includes determining that a modulation coding scheme (MCS) table configured for at least one of a downlink channel or an uplink channel is an MCS table used for the URLLC service.

In some aspects, determining the resource allocation associated with the DCI is for the URLLC service includes determining that the DCI was transmitted repetitively in a plurality of physical downlink control channel (PDCCH) monitoring occasions on a plurality of ControlResourceSets (CORESETs) for the URLLC service.

In some aspects, determining the resource allocation associated with the DCI is for the URLLC service includes determining that the DCI includes a physical downlink control channel (PDCCH) monitoring occasion having a periodicity of less than one slot.

In some aspects, the first behavior is different than the second behavior.

In some aspects, the first PTRS parameter and the second PTRS parameter include at least one of a time domain density or a frequency domain density.

In some aspects, the first PTRS parameter is included in a first radio resource control (RRC) information element (IE), and the second PTRS parameter is included in a second RRC IE, the first RRC IE being different than the second RRC IE.

In some aspects, the first PTRS parameter is determined using a first modulation coding scheme (MCS) index, and the second PTRS parameter is determined using a second MCS index.

In some aspects, the first PTRS parameter is determined by a first frequency resource allocation, and the second PTRS parameter is determined by a second frequency resource allocation.

In some aspects, the second PTRS parameter is determined based on a predetermined time domain density.

In some aspects, the second PTRS parameter is determined based on a predetermined frequency domain density.

In some aspects, at least one of the first PTRS parameter or the second PTRS parameter is determined from the DCI.

In some aspects, the second beta offset is different than the first beta offset.

In some aspects, at least one of the first beta offset or the second beta offset is indicated by the DCI.

In some aspects, the first beta offset and the second beta offset are configured separately in a radio resource control (RRC) configuration.

In some aspects, the second beta offset is configured to achieve a BLER of 1e-5.

In some aspects, the second beta offset is applied to calculate uplink control information (UCI) bits of one or more CSI parameters for a channel quality indicator (CQI) table associated with the URLLC service when the joint CSI report is for the URLLC service.

In some aspects, the joint CSI report includes one or more CSI parameters for a first channel quality indicator (CQI) table with a first block error rate (BLER) of 1e-1 and one or more CSI parameters for a second CQI table with a second BLER of 1e-5.

In some aspects, uplink control information (UCI) bits of the one or more CSI parameters for the first CQI table are calculated using the first beta offset, and wherein UCI bits of the one or more CSI parameters for the second CQI table are calculated using the second beta offset.

In some aspects, the UCI multiplexing includes transmitting multiple UCI on a PUCCH resource.

In some aspects, the PUCCH format is PUCCH format 2.

In some aspects, the UCI multiplexing is performed based on one or more PUCCH resources overlapping, the one or more PUCCH resources being associated with at least one of a hybrid automatic repeat request acknowledgment (HARQ-ACK), at least one CSI report, or at least one scheduling request (SR) report.

In some aspects, the UCI for the eMBB service is dropped when UCI bits are determined to exceed a capacity of a PUCCH resource.

In some aspects, dropping the UCI of the CSI report for the eMBB service includes dropping the portion of the joint CSI report for the eMBB service.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 5 illustrates an example of an RRC configuration, in accordance with some examples provided herein;

FIG. 6 illustrates an example of a detailed CSI report configuration, in accordance with some examples provided herein;

FIG. 8 illustrates an example of a beta offset configuration, in accordance with some examples provided herein;

FIG. 10 illustrates that the BS may configure the UE with two CSI report configurations, in accordance with some examples provided herein;

FIG. 12 is an example of a PUCCH configuration, in accordance with some examples provided herein;

FIG. 13 is an example of a MCS table for high reliability (URLLC) transmission, in accordance with some examples provided herein;

FIG. 14 is an example of a MCS table for 64 QAM for normal reliability transmission, in accordance with some examples provided herein;

FIG. 15 is an example of a MCS table for 256 QAM for normal reliability transmission, in accordance with some examples provided herein;

FIG. 16 is an example of a mapping table between MCS and PTRS time domain density, in accordance with some examples provided herein;

FIG. 17 is an example of a mapping table between scheduled bandwidth and PTRS frequency domain density, in accordance with some examples provided herein;

FIG. 19 illustrates an example of a DL-PTRS configuration, in accordance with some examples provided herein;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted above, the 5G New Radio (NR) Access Technology includes the enhanced Mobile Broadband (eMBB) and Ultra Reliable Low Latency Communication (URLLC) services. The eMBB service may be used to provide high data rates across a wide coverage area. The URLLC service may be used to achieve high reliability and low latency in a wireless network. During simultaneous transmission of URLLC and eMBB service, some configurations for eMBB service can be used by URLLC service. However, the latency and reliability requirements may be different between URLLC and eMBB service. In addition, the parameters for eMBB service may not fulfill the requirements of the URLLC service. Techniques are described herein for handling eMBB and URLLC simultaneous transmissions, which can ensure the performance of URLLC service. Some of the issues with current eMBB and URLLC simultaneous transmissions are discussed below. Before discussing such issues, an example of a wireless communication system will be described with respect to FIG. 1, FIG. 2, and FIG. 3.

Figure 1:
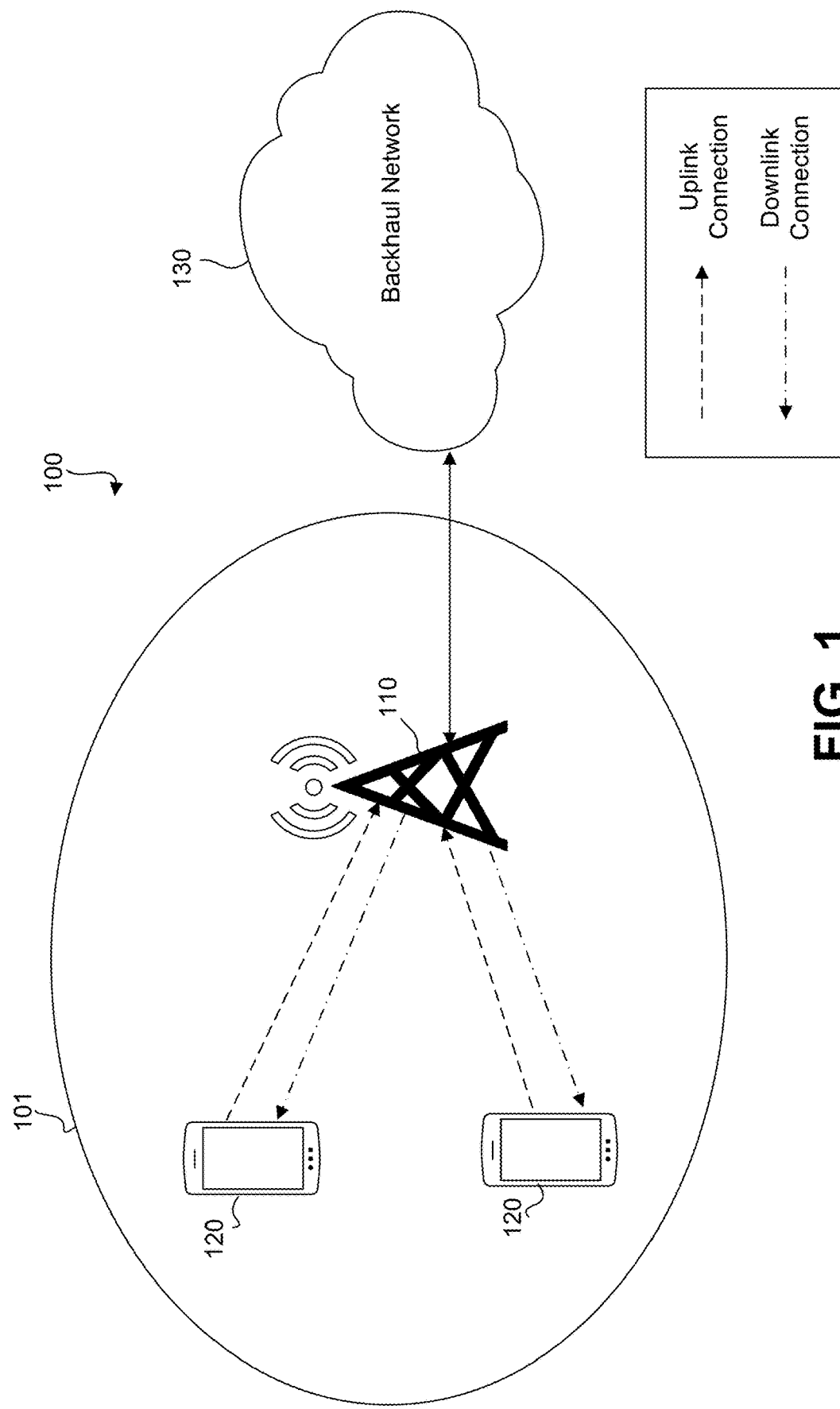
FIG. 1 illustrates a network for communicating data streams, in accordance with some examples provided herein.

FIG. 1 is a diagram illustrating a network 100 for communicating data streams. As used herein, "data streams" may include voice streams and streaming data for text messaging such as short message service (SMS) messages, multimedia message service (MMS) messages, applications, uploads, downloads, e-mails, and the like. The network 100 may comprise an access point (AP) 110. The AP 110 may be any component or collection of components configured to provide wireless access, such as a base station. The base station may be, for example, an enhanced base station (eNB or eNodeB), or Next Generation nodeB (gNB). The AP 110 may have a coverage area 101 (such as a cell), one or more mobile devices 120, and a backhaul network 130. Although shown and described as having two mobile devices 120, it is contemplated that there can be any number of mobile devices 120, ranging from just one mobile device 120 to thousands or even more mobile devices 120.

The AP 110 may establish uplink and/or downlink connections with the mobile devices 120. The uplink and/or downlink connections may carry data between the mobile devices 120 and the AP 110. Although a certain number of components are shown and described, it is contemplated that any number of additional components may be provided or may be omitted from FIG. 1 for the purpose of simplicity, such as routers, relays, remote radio heads, and the like.

5G represents the fifth generation of digital cellular networks. 3GPP generally refers to 5G New Radio (5G NR) as "5G". Worldwide, companies are beginning to offer 5G hardware and systems for carriers, which are providing high download and upload speeds as compared to previous technologies. In general, as with previous wireless technologies, 5G service areas are divided into geographical areas called cells. When user equipment crosses from one geographical cell to another, the communication is handed off between two geographical cells in such a way that the communication is not dropped and little to no observable differences are seen.

Figure 2:
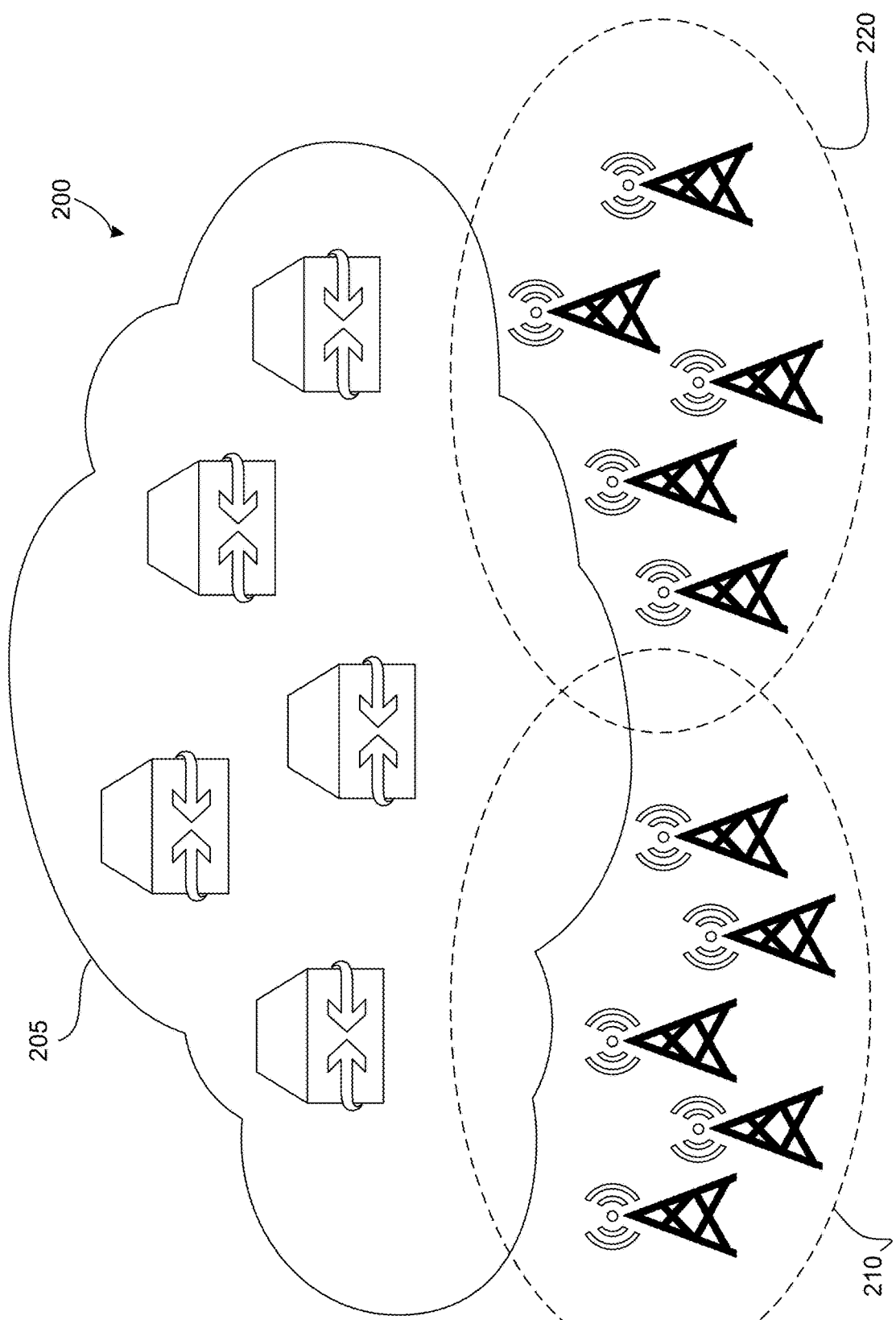
FIG. 2 illustrates a 5G network architecture comprising a wireless network serving multiple RANs, in accordance with some examples provided herein.

Aspects of the present disclosure may be implemented in 5G wireless networks that may include multiple radio access networks (RANs). FIG. 2 is a diagram illustrating a 5G network architecture 200 comprising a wireless network 205 serving multiple RANs, including a first RAN 210 and a second RAN 220. The wireless network may comprise various gateway devices, such as serving gateways and pack data network gateways. In addition, the RANs may include one or more APs, such as base stations or nodes, which can include gNBs for 5G telecommunications networks.

Three main types of use cases have been defined for 5G: eMBB, URLLC, and Massive Machine Type Communications (mMTC). eMBB appreciates faster connections, more capacity, and higher throughput as compared to 4G. For example, eMBB may appreciate 10-20 Gbps peak, 100 Mbps when needed, up to 10,000 times more traffic, support for macro and small cells, support at up to 500 km/h for high mobility, and significant network energy savings. URLLC provides uninterrupted data exchange for mission critical applications that may require fast response rates. For example, URLLC may be extremely responsive with under 1 millisecond (ms) of air interface latency. In addition, URLLC may be highly reliable and available at rates of almost 100%. URLLC appreciates low to medium data rates and high speed mobility. As compared to 4G, URLLC may appreciate a latency target of 1 ms, while eMBB appreciates a latency target of 4 ms. In comparison, 4G can and do experience latency times of greater than 20 ms. mMTC supports scalability and increased lifetime due to a large number of low power devices in a widespread area. For example, mMTC may support a high density of devices over a long range, a low data rate, low cost, and long lasting battery power.

Figure 3:
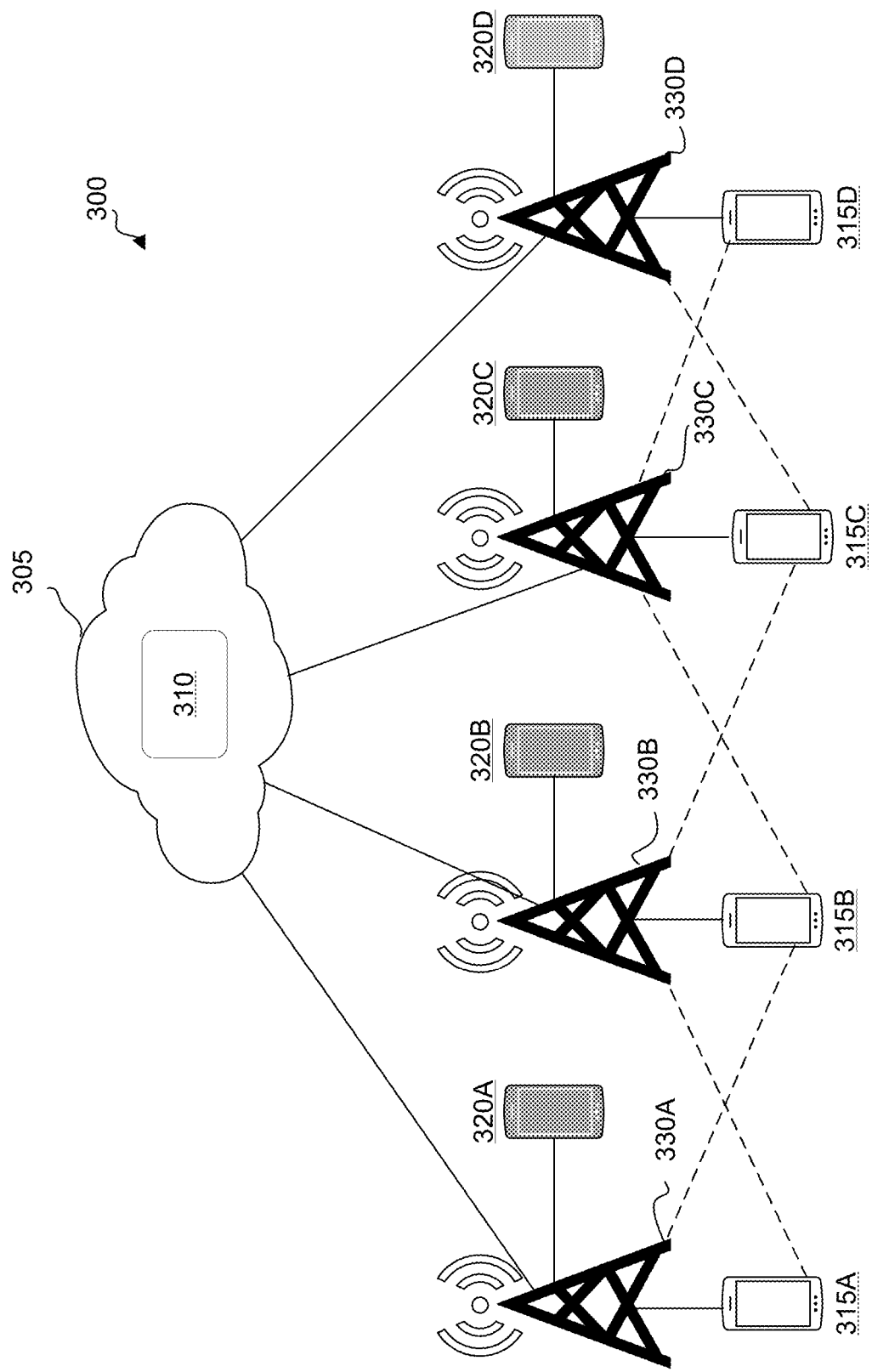
FIG. 3 illustrates an example of a multi-cell Cloud Radio Access Network (C-RAN) architecture that implements multiplexing of eMBB and URLLC users in the uplink, in accordance with some examples provided herein.

In some cases, a network (e.g., a 5G network) can provide simultaneous eMBB and URLLC transmissions (e.g., in the uplink and/or downlink). A URLLC service can achieve high reliability and low latency in a wireless network, while an eMBB service allows for high transmission rates and non-critical latency requirements. Some techniques, such as non-orthogonal multiple access (NOMA) techniques allow for simultaneous transmissions of users from different services. eMBB and URLLC users may coexist on the same radio resources in either a single cell or multiple cells. FIG. 3 illustrates an exemplary multi-cell Cloud Radio Access Network (C-RAN) architecture 300 that implements multiplexing of eMBB and URLLC users in the uplink. Access points 330A, 330B, 330C, and 330D are in communications with UEs 315A, 315B, 315C, and 315D operating on eMBB, and are also in communication with UEs 320A, 320B, 320C, and 320D operating on URLLC. The access points 330A-330D are in communication with a baseband unit (BBU) 310 in a cloud network 305.

A number of agreements were reached during the 3GPP meetings on Channel Quality Indicator (CQI)/Modulation Coding Scheme (MCS) reporting for URLLC. For example, the two Block Error Rate (BLER) targets that are configurable for URLLC for Channel State Information (CSI) reporting are 1e-1 and 1e-5 (Option B). The notation 1e-1 can be represented as $10^{-1}$, and the 1e-5 notation can be represented as $10^{-5}$. It was decided that the definition of the test case for the BLER target of 1e-5 should take into account channel and interference variations and estimation errors.

It was also decided that the highest spectral efficiency for CQI based on the 1e-5 BLER target for URLLC should be no more than 772/1024*6. Further, the highest spectral efficiency for CQI based on the 1e-1 BLER target for URLLC should be no more than 873/1024*6. However, this does not necessarily mean that the CQI table introduced for eMBB cannot be directly reused for URLLC. In addition, it is unclear whether two separate tables should be used or a single table covering both BLER targets.

In total, there are two CQI tables for URLLC CQI reporting. The first table is the same as the existing 64 QAM (Quadrature Amplitude Modulation) CQI table without any change, which is to be used for BLER target 1e-1 for URLLC. This means that the agreement on highest spectral efficiency being no more than 873/1024*6 is overturned. The new table will have entries corresponding to BLER target 1e-5. For CSI reporting, the CQI field is 4-bit.

In a CSI report, Radio Resource Control (RRC) parameter cqi-Table implicitly provides the BLER target for CQI reporting. The new 64 QAM table implies a BLER target of 1e-5 only. The existing 64 QAM table and 256 QAM table imply a BLER target of 1e-1 only.

For grant-based transmissions for URLLC, one RRC parameter was introduced for configuring a new radio network temporary identifier (RNTI). When the new RNTI is not configured, existing RRC parameter MCS-table is extended to select from three MCS tables (including the existing 64 QAM MCS table, the existing 256 QAM MCS table, or a new 64 QAM MCS table). When the MCS-table parameter indicates the new 64 QAM MCS table, the existing 64 QAM MCS table is used for Downlink Control Information (DCI) format 0_0/1_0 in the Common Search Space (CSS). The new 64 QAM MCS table is used for DCI formats 0_0/1_0/0_1/1_1 in the User Equipment Specific Search Space (USS). Otherwise, existing behavior should be followed. It is important to note, however, that the configuration for downlink and uplink is separate. When the new RNTI is configured, RNTI scrambling of DCI cyclic redundancy check (CRC) is used to choose the MCS table. For example, if the DCI CRC is scrambled with the new RNTI, the new 64 QAM MCS table is used. Otherwise, existing behavior should be followed.

The coexisting eMBB and URLLC services may present a variety of issues. For example, some configurations for eMBB service can be used by URLLC service during simultaneous transmission of URLLC and eMBB service. However, the latency and reliability requirements may be different between URLLC and eMBB service. In addition, the parameters for eMBB service may not fulfill URLLC service. Some of the issues with current simultaneous transmission systems are discussed below.

For URLLC service, higher reliability requirements are needed for a transmission, e.g., 1e-5 with a user plane latency of 1 ms. The new CQI table is designed based on a 1e-5 BLER target. Therefore, the lower code rate entries are required for CQI table design. With the new CQI table, multiple CSI reports based on the different BLER targets are required for user equipment (UE) with simultaneous eMBB and URLLC services. Thus, a new design may be needed to achieve this objective.

In addition, beta offset for UE to calculate the number of Uplink Control Information (UCI) bits can be different between eMBB and URLLC due to different requirements. For example, beta offset for URLLC service can be larger than beta offset for eMBB service for fulfilling high reliability. Beta offset is configured per Physical Uplink Shared Channel (PUSCH), and the CSI report for eMBB and URLLC could be triggered separately and dynamically. A new design for beta offset is thus needed for UE with simultaneous eMBB and URLLC service.

Another issue arises related to UCI multiplexing. UE transmits multiple UCI bits of multiple CSI reports and/or Hybrid Automatic Repeat Request (HARQ) bits and/or Status Register (SR) bits in a single Physical Uplink Control Channel (PUCCH) resource when the PUCCH resource associated with those UCI bits are partially overlapped, and overlapped PUCCH resources satisfy the timeline requirement. The PUCCH resource for performing UCI multiplexing can be PUCCH format 2, PUCCH format 3, and PUCCH format 4. UE can choose one of the PUCCH resources amongst all configured PUCCH resources in consideration of the total UCI payload size and the capacity of the PUCCH resource. Because UE can be simultaneously launched with eMBB and URLLC service, it is possible that UE can perform UCI multiplexing on PUCCH format 3 or PUCCH format 4, which may not satisfy the latency requirement of URLLC service. Thus, a new design for UCI multiplexing on the PUCCH resource is needed.

Time domain density of Phase Tracking Reference Signal (PTRS) is determined by the MCS index. The MCS table may be different between eMBB service (e.g., associated with an MCS table with a target BLER of 1e-1) and URLLC service (e.g., associated with an MCS table with a target BLER of 1e-5 or more). Hence, the MCS index to determine time domain density of PTRS can be different. A new design for a dedicated MCS index for PTRS transmission with high reliability is needed.

Another issue that has been identified is the oversized Transport Block Size (TBS) of retransmission by the MCS table for high reliability (e.g., when target BLER is 1e-1). When performing a PDSCH or PUSCH retransmission, if the MCS index is larger than 28 when applying the 64 QAM MCS table (e.g., MCS index is 29, 30, or 31), or larger than 27 when applying the 256 WAM MCS table (e.g., MCS index is 28, 29, 30, or 31), the UE will assume the TBS is the same as the TBS determined most recently for the same transport block. UE will calculate the coding rate to obtain the same TBS as the initial transmission based on TBS, modulation, and resource allocation in the Downlink Control Information (DCI) for transmission. However, because the higher coding rate may decrease reliability, the UE should not apply a higher coding rate when the higher reliability MCS table is used for the PDSCH. Thus, a new design addressing this issue may be needed.

In addition, when the UE performs Bandwidth Parts (BWP) switching, it is unclear which MCS table configuration (either configured in active BWP configuration or new BWP configuration) will be applied for the DCI. Thus, a new design addressing this issue is needed. Similarly, when the UE performs cross-carrier scheduling, it is also unclear which MCS table configuration is be applied for the DCI (either MCS table configured in scheduling cell or MCS table configured in scheduled cell). A new design addressing this issue may be needed as well.

Methods, apparatuses, and computer-readable media provide techniques for addressing the above-noted issues when UE is simultaneous with eMBB and URLLC services. When UE is simultaneous with eMBB and URLLC services, UE may distinguish URLLC service from the eMBB service using various techniques. In some cases, UE can distinguish whether the resource allocation within a DCI is for eMBB and URLLC based on the scrambling of the RNTI. For instance, the UE can determine that a resource allocation is for URLLC when one or more cyclic redundancy check (CRC) bits of the DCI are scrambled with the RNTI. If the DCI is aimed for URLLC service, UE may assume that all of the scheduling information (e.g., CSI request, resource allocation, and SRS request) is for URLLC service. In some examples, UE may assume the DCI within a UE-specific search space is for URLLC service if the MCS table configured to PDSCH/PUSCH is the MCS table for high reliability service (e.g., the target BLER is 1e-5). In some examples, UE may assume a DCI with DCI format which comprises less bits than DCI formats for normal eMBB service (e.g., DCI format 0_0 and DCI format 0_1). The DCI format 1_0 and the DCI format 1_1 are for URLLC service. In some examples, UE may assume the DCI which is transmitted repetitively in more than one PDCCH monitor occasion on different CORESETs is for URLLC service. In some examples, UE may assume a DCI within a PDCCH monitor occasion which has periodicity less than 1 slot is for URLLC service. In some cases, MAC-CE or RRC signaling may be used by UE to determine URLLC or eMBB service.

Although UE may assume that one DCI is for URLLC service based on the above approaches, there are other ways that the UE may determine that the DCI is for URLLC service. For example, UE may assume that the CSI report is for URLLC service based on CQI table configuration. If a configured CQI table is for high reliability service, the UE may assume that this CSI report is for URLLC service. Even though the CSI report is not required to report the Pre-coding Matrix Indicator (PMI), such as the L1-RSRP report or the non-PMI report, the base station (e.g., gNB) can still configure the CQI table configuration for the UE to distinguish the CSI report for URLLC service or eMBB service. In another example, the CSI report configuration may contain a new information element (IE) to indicate whether this is for URLLC service or not.

The UE may assume that one CSI report is for URLLC service based on these approaches, but are not restricted to these approaches. The approaches described above for enabling the UE to distinguish the CSI report and DCI for URLLC service and eMBB service can be applied for a joint CSI report with simultaneous eMBB and URLLC services.

As noted above, for URLLC service, higher reliability requirements are needed for a transmission (e.g., 1e-5 with a user plane latency of 1 ms). The new CQI table recently introduced in 5G NR is designed based on a 1e-5 BLER target, requiring lower code rate entries for CQI table design. Based on the new CQI table, multiple CSI reports based on the different BLER targets are required for user equipment (UE) with simultaneous eMBB and URLLC services. In some aspects, the UE calculates the CSI parameter for a CSI report based on the CQI table configuration in the CSI report configuration. If the CQI table configuration indicates a CQI table with a target BLER of 1e-1, the UE may calculate a CSI parameter (e.g., PMI, CQI, RI, and/or LI) based on the target BLER of 1e-1. Otherwise, if the CQI table indicates a target BLER of 1e-5 or higher for high reliability service (URLLC), UE may calculate the CSI parameter based on the target BLER of 1e-5. However, because UE could have simultaneous eMBB and URLLC service, and URLLC service requires high reliability and low latency, the UE may not yet be configured with an aperiodic or semi-persistent CSI report with a high reliability CQI table. In such a case, the UE may not be able to trigger an aperiodic or semi-persistent CSI report for URLLC service in sufficient time for DCI. In addition, the same CSI resource or CSI resource set could be reused by both eMBB and URLLC service.

Thus, a joint CSI report may be used for eMBB and URLLC service. For example, in one CSI report, UE may transmit both the CSI parameter for the CQI table with BLER as 1e-1 (for eMBB service), and the CSI parameter for the CQI table with BLER as 1e-5 (for the URLLC service). In some examples, UE may trigger the use of a joint CSI report when the aperiodic or semi-persistent CSI report triggered by the DCI is for URLLC service (e.g., determined using the techniques described above). In some examples, UE may trigger the CSI report when the CQI table configuration indicates that both the CQI table for BLER is 1e-1 and the CQI table for BLER is 1e-5.

For example, a new information element (IE) or new indicator for the CQI table configuration may be used that indicates simultaneous CSI report calculation for high reliability (URLLC) and normal reliability (eMBB). If the UE receives a CSI report configuration including this new indicator and the indicator is turned on (e.g., set to true), UE may perform a joint CSI report for eMBB and URLLC based on DCI or search space, as described above. The joint CSI report may include both periodic reporting (e.g., both may apply common reporting periodicity by implicit configuration), semi-persistent reporting, and aperiodic reporting, and the base station (e.g., the gNB) may provide the corresponding resources for reporting accordingly.

In some aspects, the UE is not required to perform a joint CSI report if the rank restriction of the CSI report reveals that this CSI report has to contain CSI parameters for two transport blocks. For example, if the rank restriction is more than 4 for this CSI report, which means that the UE can only report the CSI parameter by assuming the layer of the channel is more than 4, UE may not need to calculate the CSI parameter for a high reliability CSI report. In some aspects, UE is not required to perform a joint CSI report if the URLLC service and eMBB service are in different bandwidth parts (BWPs). The joint CSI report occupies more CSI processing unit (i.e., CPU) space than the CSI report for only eMBB or only URLLC. In addition, when performing a joint CSI report, the CSI parameter associated with high reliability CQI table corresponds to the first transport block since URLLC service has higher priority and the CSI parameter associated with the CQI table with 1e-1 BLER corresponds to the second transport block.

In some aspects, a CSI report that includes CSI parameters corresponds to three transport blocks (TBs): one TB is for URLLC service, and the other two TBs are for eMBB service. When the CSI parameter corresponds to the CQI table with target BLER 1e-1 and target BLER 1e-5, the PMI/RI/LI/CRI value can be the same if there is no rank restriction for CQI table with BLER 1e-1. Therefore, in some aspects, UE is only required to report a CQI differential value between the CQI derived from two different CQI tables, and PMI/CRI/LI/RI values are applied for different CQI tables if reported.

Figure 4:
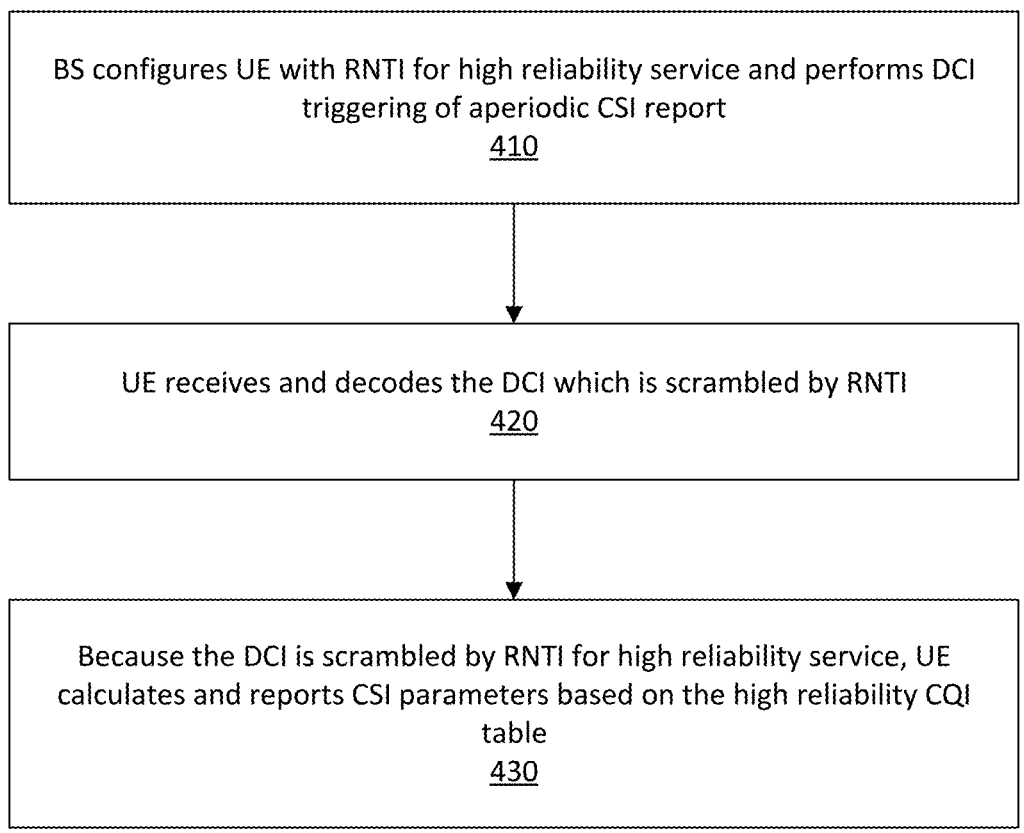
FIG. 4 is a flowchart illustrating a method for performing a joint CSI report for UE with simultaneous URLLC and eMBB service, in accordance with some examples provided herein.

An illustrative example (denoted as Example 1) will now be provided, where a joint CSI report is generated by a UE with simultaneous URLLC and eMBB services. FIG. 4 is a flowchart illustrating a method for performing a joint CSI report for UE with simultaneous URLLC and eMBB service. At step 410, the BS (e.g., a gNB) configures the UE with RNTI for high reliability service and CSI-AperiodicTriggerState for DCI triggering of an aperiodic CSI report. FIG. 5 illustrates an example of an RRC configuration according to Example 1. The UE may be configured with four CSI-AperiodicTriggerState parameters, where each CSI-AperiodicTriggerState may include one CSI-AssociatedReportConfigInfo parameter in CSI-AperiodicTriggerState. Each CSI-AssociatedReportConfigInfo may be associated with one CSI report configuration and one CSI RS resource configuration, as shown in FIG. 5. In the CQI table configuration, index #0 may be for the CQI table with target BLER 1e-1 and index #1 may be for the high reliability CQI table (e.g., target BLER is 1e-5).

Turning back to FIG. 4, at step 420, the UE may successfully receive and decode the DCI which is scrambled by RNTI for high reliability service (indicating to the UE that the DCI is for a URLLC service), and the DCI may include a CSI request field which indicates the UE to trigger the third CSI aperiodic trigger state which corresponds to CSI report configuration #3 and CSI resource configuration #2. FIG. 6 illustrates an example of a detailed CSI report configuration according to Example 1.

Turning back to FIG. 4, at step 430, the UE may calculate and report CSI parameters based on the high reliability CQI table because the DCI is scrambled by RNTI for high reliability service, even though the CSI report configuration #2 indicates a CQI table with BLER 1e-1. UE may transmit the CSI report including a CSI parameter set of CQI/PMI/LI/RI/CRI based on the CQI table with BLER 1e-1. The CSI parameter set for the CQI table with BLER 1e-1 may include two CQI values, because of the rank restriction. In some aspects, the CSI value is the same.

As noted previously, beta offset is configured per Physical Uplink Shared Channel (PUSCH), and the CSI report for eMBB and URLLC could be triggered separately and dynamically. Techniques are also described for performing beta offset of PUSCH with simultaneous eMBB and URLLC services. Beta offset is a parameter used for UE to calculate the actual coding rate of UCI bits when UE performs UCI multiplexing on PUSCH. Because eMBB and URLLC may have different requirement of beta offset values, for example, URLLC service may require a highly reliable CSI report. Hence, the beta offset value for URLLC can be larger than beta offset value for eMBB. Currently, beta offset can be configured by RRC, and beta offset may support a dynamic indication by DCI. In addition, one beta offset value may be configured in RRC in the case that dynamic switch beta offset is not supported. Otherwise, four beta offset values may be configured in RRC configuration, and UE may indicate one of them based on DCI.

To support URLLC service simultaneously, there may be new beta offset value(s) for URLLC service in a dynamic beta offset switch case and a semi-static beta offset case. The configured URLLC beta offset values for the dynamic indication case can be four, but are not limited to this value only, and URLLC beta offset may be the beta offset value aimed to achieve BLER 1e-5 transmission. This design may be used for an aperiodic CSI report, a semi-persistent CSI report or any CSI report multiplexing on PUSCH. The UE may apply beta offset for URLLC service to calculate corresponding UCI bits of CSI parameters when the aperiodic or semi-persistent CSI report triggered by DCI is for URLLC or the CSI report is aimed for URLLC service. In some aspects, if one CSI report on PUSCH contains both CSI parameters associated with the CQI table with BLER 1e-1 and the CSI parameters associated with the CQI table with BLER 1e-5, UCI bits of CSI parameter associated to CQI table with BLER 1e-1 may be calculated according to the normal beta offset value. UCI bits of the CSI parameter associated with the CQI table with BLER 1e-5 may be calculated according to beta offset value for URLLC service. MAC-CE can also be used for indicating a new beta offset value for UE.

Figure 7:
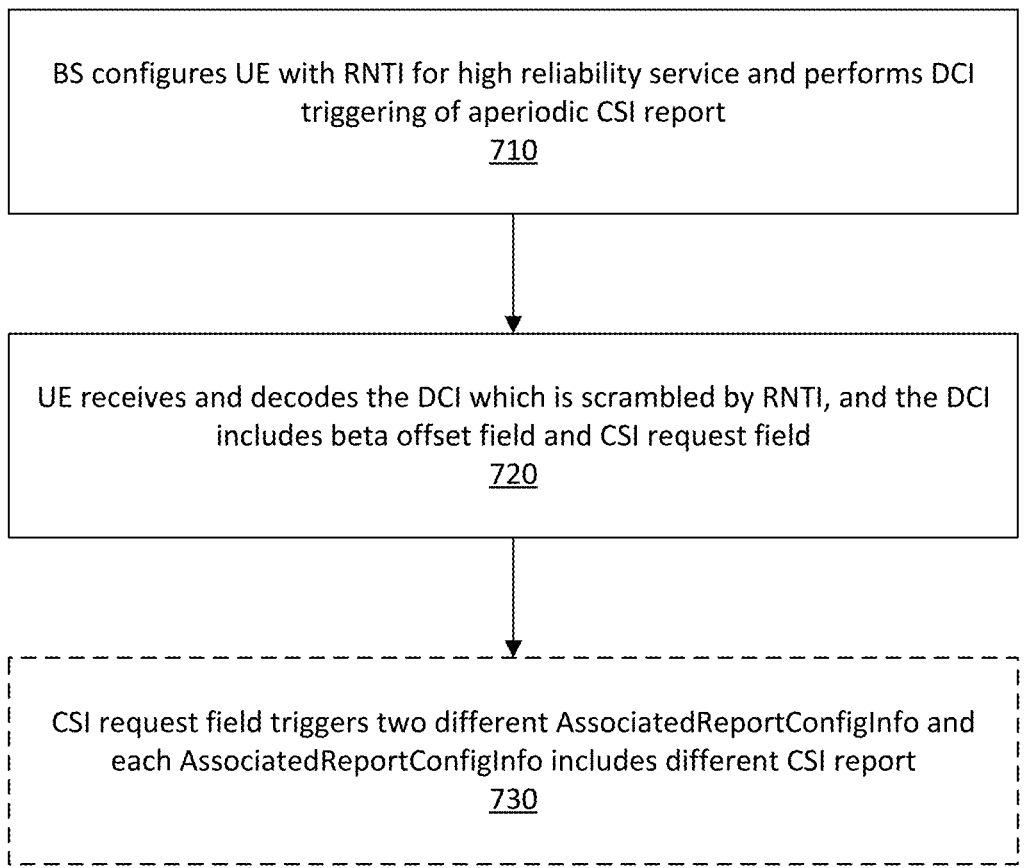
FIG. 7 is a flowchart illustrates an example of a flowchart of a method for performing beta offset of PUSCH for UE with simultaneous eMBB and URLLC service, in accordance with some examples provided herein.

An illustrative example (denoted as Example 2) will now be provided, where a beta offset of PUSCH is determined for a UE with simultaneous URLLC and eMBB services. FIG. 7 is a flowchart illustrating a method for performing beta offset of PUSCH for UE with simultaneous eMBB and URLLC service. At step 710, the BS (e.g., a gNB) configures the UE with RNTI for high reliability service and CSI-AperiodicTriggerState for DCI triggering aperiodic CSI report. The UE is configured with four CSI-AperiodicTriggerState parameters, and each CSI-AperiodicTriggerState may include one CSI-AssociatedReportConfigInfo parameter in CSI-AperiodicTriggerState. Each CSI-AssociatedReportConfigInfo may be associated with one CSI report configuration and one CSI RS resource configuration. In the CQI table configuration, index #0 may be for the CQI table with a target BLER of 1e-1 and index #1 may be for a high reliability CQI table (e.g., target BLER 1e-5). FIG. 8 illustrates an example of a beta offset configuration. For example, UE may be configured with beta offset based on a UCI-on-PUSCH IE of the RRC configuration, as illustrated by the configuration shown in FIG. 8. In some aspects, the UE is configured with a dynamic beta offset indication, 4 beta offset values for normal reliability transmission (e.g., target BLER is 1e-1), denoted as beta offset ID#1, ID#3, ID#4, and ID#5 in FIG. 8, and 4 beta offset values for high reliability URLLC transmission (e.g., target BLER is 1e-5), denoted as beta offset ID#5, ID#8, ID#10, and ID#11 in FIG. 8.

At step 720, the UE successfully receives and decodes the DCI which is scrambled by RNTI for high reliability service (indicating to the UE that the DCI is for a URLLC service), and the DCI contains the beta offset field and the CSI request field. In one illustrative example, the beta offset field is "10" (representing the third beta offset entry). The beta offset field of "10" indicates UE to calculate UCI bits of the CSI report that is triggered by the CSI request field based on beta offset ID#10 under the URLLC beta offsets because the DCI is scrambled by RNTI for high reliability service, which indicates to the UE that the DCI is for a URLLC service.

At step 730, the CSI request field may trigger two different AssociatedReportConfigInfo and each AssociatedReportConfigInfo contains a different CSI report. One CSI report is configured with CQI table for BLER target 1e-1, and the other CSI report is configured with CQI table for BLER target 1e-5. The beta offset field is "10," which indicates UE to calculate UCI bits of CSI report which is triggered by CSI request field based on beta offset ID#4 and ID#10 (as shown in FIG. 8) for UCI bits of CSI report with CQI table for BLER target 1e-1 and UCI bits of CSI report with CQI table for BLER target 1e-5, respectively. Step 730 is an optional step (as indicated by the dashed outline of step 730 in FIG. 7) that can be performed in some cases and may not be performed in other cases.

As noted above, because UE can be simultaneously launched with eMBB and URLLC service, it is possible that UE can perform UCI multiplexing on PUCCH format 3 or PUCCH format 4, which may not satisfy the latency requirement of URLLC service. Techniques are described for providing new design for UCI multiplexing on a PUCCH resource for UE with simultaneous eMBB and URLLC services. UCI multiplexing in a PUCCH resource means that the UE transmits multiple UCI on a PUCCH resource when the PUCCH resources for HARQ-ACK, scheduling request (SR), or CSI report is overlapped partially or fully and the timeline requirement is fulfilled. The timeline requirement is met if the first symbol of the earliest PUCCH(s)/PUSCH(s) among all the overlapping channels starts no earlier than symbol N1+X after the last symbol of PDSCH(s), and if the first symbol of the earliest PUCCH(s)/PUSCH(s) among all the overlapping channels starts no earlier than N2+Y after the last symbol of PDCCHs scheduling UL transmissions including HARQ-ACK and PUSCH (if applicable) for slot n, where N1, N2, X and Y are preconfigured values defined in the specification related to UE capability, PDSCH and PUSCH configuration.

Based on current designs, PUCCH resource of PUCCH format 2, PUCCH format 3 and PUCCH format 4 can be used for UCI multiplexing. However, PUCCH format 3 and PUCCH format 4 are long PUCCHs, which may not fulfill the requirement of URLLC service. Hence, the PUCCH format may be restricted when performing multiplexing (e.g., of HARQ and/or of CSI report). For example, the PUCCH format 3 and PUCCH format 4 may not be used when the PUCCH transmission is triggered by DCI that is for high reliability service (URLLC), the PUCCH resource contains UCI bits of CSI report which is for high reliability service, or the URLLC service is detected using another technique. In some aspects, the PUCCH resource of HARQ-ACK indicated by PUCCH resource indictor in DCI overlaps with the PUCCH resource of the CSI report, and the UE is capable of UCI multiplexing in one PUCCH resource. Hence, UE may select a PUCCH resource based on PUCCH resource indicator and the total bits of HARQ-ACK and CSI report and the capacity of each PUCCH resource with different PUCCH format. Even though UE is configured with PUCCH resources of PUCCH format 2, PUCCH format 3 and PUCCH format 4, UE may only select PUCCH format 2 to fulfill the latency requirement of URLLC if DCI is scrambled by RNTI that is for high reliability service or if the CSI report is for high reliability service.

In some aspects, PUCCH resources of more than one CSI report are overlapped with each other, and UE is capable of UCI multiplexing in one PUCCH resource. In such aspects, UE will select a PUCCH resource based on total UCI bits and the capacity of each PUCCH resource with different PUCCH format. Even though UE is configured with PUCCH resources of PUCCH format 2, PUCCH format 3 and PUCCH format 4, UE may only select PUCCH format 2 to fulfill the latency requirement if the CSI report is for high reliability service (or the URLLC service is detected using another technique).

In some aspects, PUCCH resources of one or more than one CSI report are overlapped with PUSCH resource for aperiodic CSI report, and the UE may be capable of UCI multiplexing in one PUCCH resource. Hence, UE will select a PUCCH resource based on total UCI bits containing an aperiodic CSI report if the PUCCH resource transmits earlier than the PUSCH resource and the capacity of each PUCCH resource has different PUCCH format. Even though the UE is configured with PUCCH resources of PUCCH format 2, PUCCH format 3 and PUCCH format 4, UE may only select PUCCH format 2 to fulfill latency requirement of URLLC if the CSI report is for high reliability service (or the URLLC service is detected using another technique).

It is noted that this rule of restricting the PUCCH format when performing multiplexing in a PUCCH resource can be applied, but is not limited to these three aspects. It is also noted that the rule to determine DCI and CSI report for high reliability service can also be applied in this design.

In some cases, UE can apply a UCI dropping rule if UCI bits exceed the capacity of a PUCCH resource, and the CSI report for URLLC service has higher priority than the CSI report for CQI table with BLER 1e-1 (e.g., for eMBB service). For example, the UE can drop the CSI report for the URLLC service or the CSI report for the eMBB service. It is noted that if there is no PUCCH format 2 for the multi-CSI PUCCH resource, the UE may not perform UCI multiplexing for overlapped CSI reports, and the UE may drop a portion of CSI reports based on the CSI priority rule (e.g., whether the CSI report for the URLLC service or the eMBB service has a higher priority).

Figure 9:
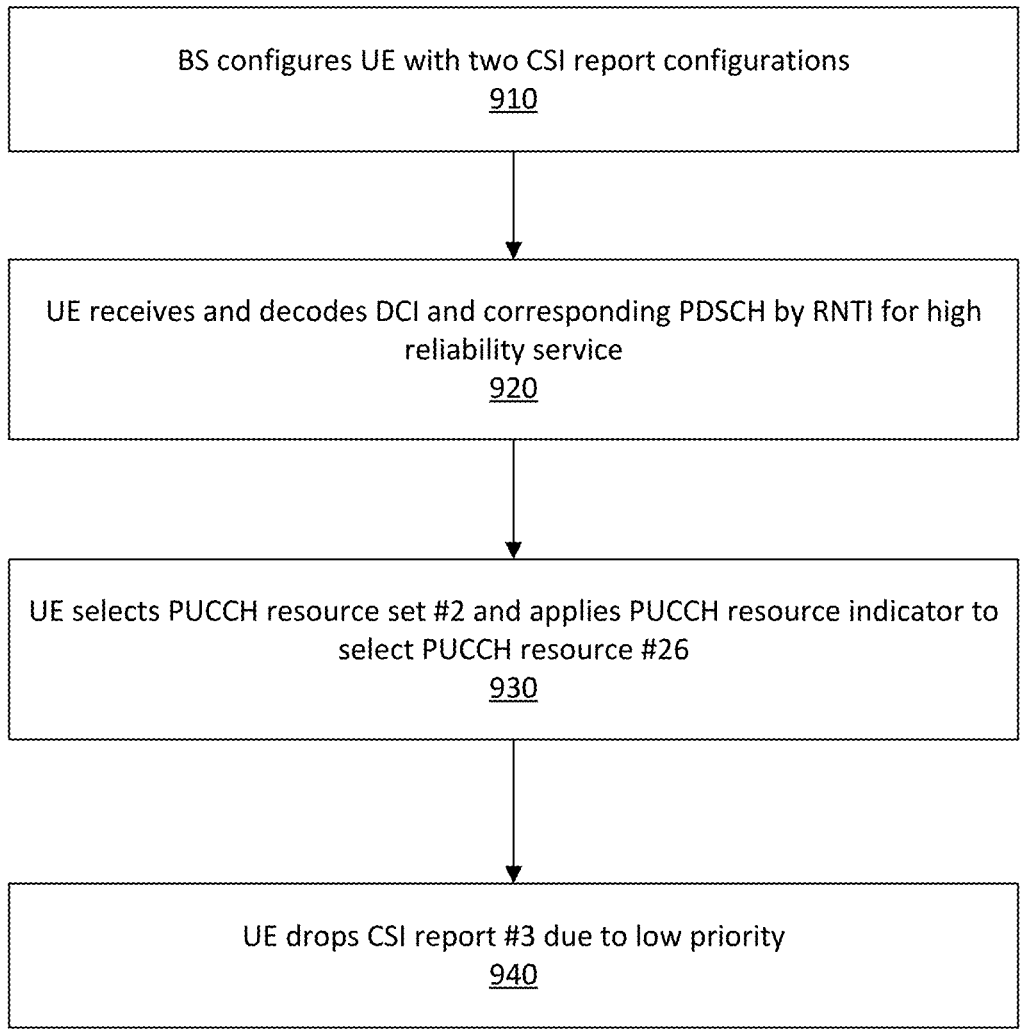
FIG. 9 is a flowchart illustrates an example of a method for UCI multiplexing in a PUCCH resource for a UE with simultaneous eMBB and URLLC service, in accordance with some examples provided herein.

An illustrative example (denoted as Example 3-1) will now be provided, where UCI multiplexing in a PUCCH resource is performed for a UE with simultaneous URLLC and eMBB services. FIG. 9 illustrates a method for UCI multiplexing in a PUCCH resource for a UE with simultaneous eMBB and URLLC service (e.g., multiplexing with two CSI reports). At step 910, the BS (e.g., gNB) may configure the UE with two CSI report configurations, as shown in FIG. 10. CSI report config#3 is the periodic CSI report for CQI table BLER target 1e-1, and CSI report config#4 is PUCCH-based semi-persistent CSI report for CQI table target 1e-5. Moreover, the UE may be configured with one or more multi-CSI resources which are PUCCH resource #12 and PUCCH resource #13. PUCCH resource #12 is PUCCH format 2 with 10 resource blocks (RBs) and 1 orthogonal frequency division multiplexing (OFDM) symbol duration. PUCCH resource #13 is PUCCH format 3 with 10 RBs and 8 OFDM symbols duration.

At step 920, the UE may receive MAC-CE, which triggers PUCCH based semi-persistent CSI report config#4, which includes PUCCH resource #4. PUCCH resource #4 may be partially overlapped with PUCCH resource #3 from CSI report config#3, in which case the UE will use the multi-CSI resource to multiplex two CSI reports.

At step 930, the UE may compare the capacity of PUCCH resource #12 and the sum of UCI bits of CSI report config#3 and CSI report config#4, and UE may find that PUCCH resource #12 cannot fulfill the payload size of the total UCI bits. In such an instance, the UE may have to use PUCCH resource #13 to multiplex the CSI reports. However, CSI report config#4 is for high reliability service and PUCCH resource #13 is PUCCH format 3. According to the above-noted PUCCH format restriction, PUCCH format 3 cannot satisfy the low latency requirement URRLC, and thus the UE may select PUCCH resource #12 to handle the multiple CSI reports.

At step 940, because PUCCH resource #12 cannot fulfill the payload size for two CSI reports, UE may drop the CSI report associated with the CSI report config#4 (for URLLC service) but only transmit CSI report associated with CSI report config#3. For example, the UE may drop CSI report #4 and can use less RBs to transmit the multiplexed PUCCH.

Figure 11:
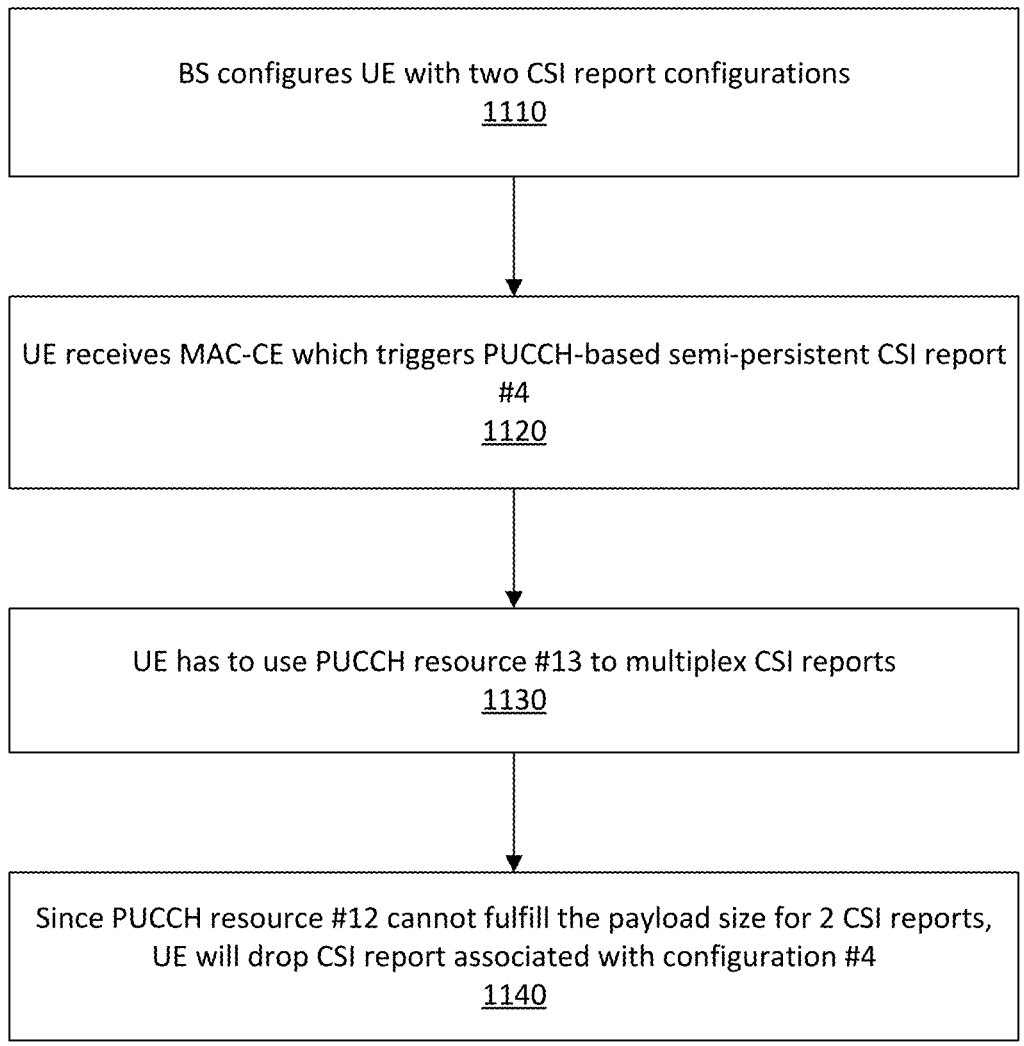
FIG. 11 is a flowchart illustrates an example of a method of UCI multiplexing in a PUCCH resource for a UE with simultaneous eMBB and URLLC service with HARQ-ACK and two CSI report multiplexing, in accordance with some examples provided herein.

Another illustrative example (denoted as Example 3-2) will be provided for UCI multiplexing in a PUCCH resource for a UE with simultaneous URLLC and eMBB services. FIG. 11 is a flowchart illustrating a method of UCI multiplexing in a PUCCH resource for a UE with simultaneous eMBB and URLLC service (e.g., for HARQ-ACK and two CSI report multiplexing). At step 1110, the BS (e.g., gNB) may configure UE with two CSI report configurations, as shown in FIG. 12 illustrating an example of a PUCCH configuration. CSI report config#3 is a periodic CSI report for CQI table BLER target 1e-1, and CSI report config#4 is a PUCCH-based semi-persistent CSI report for CQI table target 1e-5 (for URLLC service). Moreover, UE is configured with PUCCH resource set #0, PUCCH resource set #1, and PUCCH resource set #2, which are provided in the configuration shown in FIG. 12. PUCCH resource set #0 is for a PUCCH resource with UCI bits of 1 or 2 bits, PUCCH resource set #1 is for a PUCCH resource with UCI bits of 2 to 60 bits, and PUCCH resource set #2 is for a PUCCH resource with UCI bits of more than 60 bits. Each PUCCH resource set may comprise several PUCCH resources, such as those shown in FIG. 12.

At step 1120, the UE may receive and decode the DCI and corresponding PDSCH by RNTI for high reliability service. The UE may send HARQ-ACK on the PUCCH resource indicated by PUCCH indicator contained in DCI. PUCCH resource indicator may be "00", which indicates the first PUCCH resource within a PUCCH resource set (e.g., PUCCH resource #10 in PUCCH-ResourceSet #0). UE may find the indicated PUCCH resource #10, for example, is overlapped with PUCCH resource#3 and PUCCH resource#4 which is for periodic CSI report and semi-persistent CSI report, respectively. In such an instance, the UE may multiplex the HARQ-ACK with the CSI report.

At step 1130, because the total UCI bits for HARQ-ACK and two CSI reports are 72 bits, UE may select PUCCH resource set#2 (because, as noted above, PUCCH resource set#2 is for a PUCCH resource with UCI bits of more than 60 bits) and may apply the PUCCH resource indicator "00" to select PUCCH resource #26 (i.e., the first resource in the resource set, as indicated by the "00" value) from the PUCCH resource set#2. The indicated PUCCH resource #26 in PUCCH resource set#2 has the PUCCH format 3, which may not satisfy the latency requirement of high reliability service since HARQ-ACK is for high reliability PDCCH and PDSCH.

In some cases, the UE can drop the low priority CSI report, and can then select a new PUCCH resource set and corresponding PUCCH resource according to new number of UCI bits. For example, at step 1140, the UE may drop CSI report config#3 due to it having a low priority, in which case the total UCI bits may become 42 bits. Therefore, UE may select PUCCH resource set #1 (because, as noted above, PUCCH resource set#1 is for a PUCCH resource with UCI bits of 2 to 60 bits) and may apply the PUCCH resource indicator "00" to select PUCCH resource#18 (i.e., the first resource in the resource set) from the PUCCH resource set#1. Because the indicated PUCCH resource #18 in PUCCH resource set#1 is with PUCCH format 2 (which is an allowable PUCCH format for URLLC according to the restriction above), the UE can multiplex CSI report #4 and HARQ-ACK in PUCCH resource #18.

Techniques are also described for providing an MCS index for time domain density of Phase Tracking Reference Signal (PTRS) time and frequency density for a UE with simultaneous URLLC and eMBB services. PTRS was introduced in NR to track the phase of the local oscillator (e.g., at the transmitter and receiver) and to mitigate performance loss due to phase noise (e.g., oscillator phase noise). In general, the phase noise of a transmitter increases as the frequency of operation increases, and thus increases as a function of oscillator carrier frequency. PTRS can be utilized at certain frequencies (e.g., high carrier frequencies, such as millimeter wave (mmWave) frequencies) to mitigate phase noise. A degradation caused by phase noise in an OFDM signal is a common phase rotation of all the subcarriers, known as common phase error (CPE). PTRS can be designed so that it has low density in the frequency domain and high density in the time domain, due to phase noise properties. For example, the phase rotation produced by CPE is identical for all subcarriers within an OFDM symbol (as noted above), but there is low correlation of phase noise across OFDM symbols. PTRS can be UE-specific, can be confined in a scheduled resource, and can be beamformed. For example, a PTRS parameter can be determined by the MCS index. PTRS can be configurable depending on UE capability, the quality of the oscillators, carrier frequency, OFDM sub-subcarrier spacing, and modulation and coding schemes used for transmission. PTRS can also be present both in uplink (e.g., in NR-PUSCH) and downlink (e.g., in NR-PDSCH) channels.

FIG. 13 is an example of a MCS table for high reliability transmission. FIG. 14 is an example of a MCS table for 64 QAM for normal reliability transmission (i.e., for a target BLER of 1e-1). FIG. 15 is an example of a MCS table for 256 QAM for normal reliability transmission (i.e., for a target BLER of 1e-1). The MCS table implemented may be different between eMBB service (e.g., associated with an MCS table with a target BLER of 1e-1) and URLLC service (e.g., associated with an MCS table with a target BLER of 1e-5 or more). Hence, the MCS index to determine time domain density of PTRS can be different. A new design for a dedicated MCS index for PTRS transmission with high reliability is provided herein.

In general, for both downlink (DL) and uplink (UL) PTRS, time domain density per slot is determined by MCS index received from DCI as shown in FIG. 16. FIG. 16 illustrates a mapping table between MCS and PTRS time domain density. However, the MCS table used for the scheduling the PDSCH or PUSCH can be different as described herein. One single MCS index could refer to different modulation and coding rate values which may require different time domain densities for PTRS.

In some examples, a new MCS index is provided for determining time domain density of PTRS for high reliability service (URLLC), which can be denoted, for example, as ptrs-MCS-urllc. When a UE receives a DCI corresponding to high reliability service (e.g., determines DCI corresponds to a URLLC service using one or more techniques described above), the UE may use the ptrs-MCS-urllc index to determine the time domain density for PTRS. It is noted that RRC parameters for high reliability service can be in any place of the RRC configuration, and is not limited to only the PTRS configuration.

In some examples, the time domain density may be fixed for high reliability URLLC service, in which case the BS (e.g., gNB) may configure a dedicated time domain density for URLLC service via PTRS configuration, and the UE may apply the time domain density if the UE receives a DCI corresponding to high reliability service, without considering the MCS index received in the scheduling DCI.

For PTRS frequency domain density, the frequency density is determined by a number of scheduled RBs allocated in the scheduling DCI, as shown in FIG. 17. For example, FIG. 17 is a mapping table illustrating a mapping between scheduled bandwidth and PTRS frequency domain density. However, the reliability requirement may be different when the UE applies MCS tables with BLER 1e-1 and 1e-5. Hence, the mapping relation between scheduled RBs and frequency domain density can be different between an MCS table with BLER 1e-1 and an MCS table with BLER 1e-5.

In some examples, a new RRC parameter is provided for frequency domain density of PTRS for high reliability service, which can be denoted, for example, NrofRB-URLLC. When a UE receives a DCI corresponding to high reliability service (e.g., determines DCI corresponds to a URLLC service using one or more techniques described above), the UE may use the NrofRB-URLLC parameter to determine the frequency domain density for PTRS. It is noted that RRC parameter for high reliability service can be in any place of the RRC configuration that relates to PTRS configuration.

In some examples, the frequency domain density may be fixed for high reliability URLLC service, in which case the BS (e.g., gNB) may configure a dedicated frequency domain density for URLLC service, and the UE may apply the frequency domain density if UE receives a DCI corresponding to high reliability service as described herein, without considering scheduled RBs allocated in the scheduling DCI.

It is noted that the value of frequency domain and time domain density for PTRS for URLLC service can be pre-defined in specifications or can be configured in an RRC configuration or other suitable configuration. Alternatively or additionally, the value of the frequency domain and/or the time domain density for PTRS for URLLC service can be signaled or informed to the UE by a MAC-CE, DCI, or other signaling information.

Figure 18:
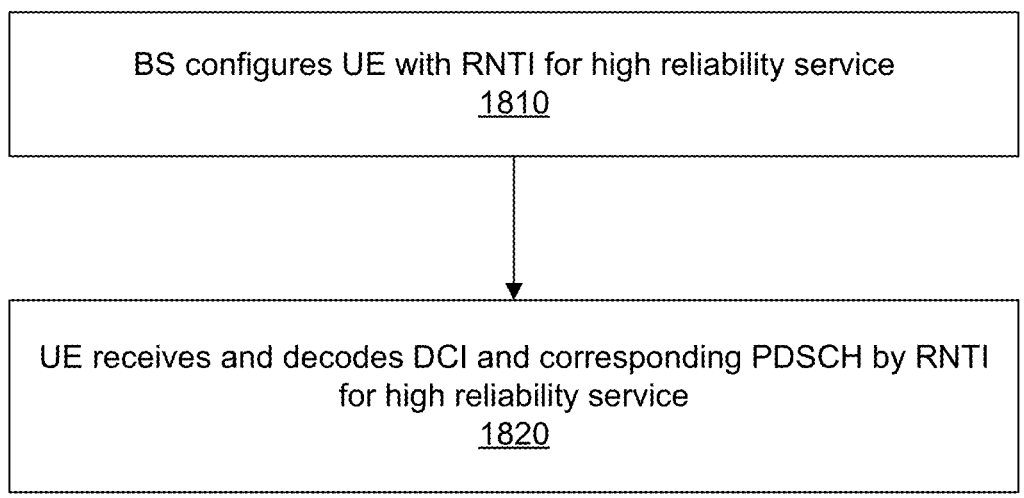
FIG. 18 is a flowchart illustrating an example of a method for determining time domain density for PTRS or high reliability service, in accordance with some examples provided herein.

An illustrative example (denoted as Example 4) will now be provided, where time domain density for PTRS for high reliability service (URLLC). FIG. 18 is a flowchart illustrating a method for determining time domain density for PTRS for high reliability service according to some aspects. At step 1810, the BS may configure the UE with RNTI for high reliability service. The BS may further configure the UE with PTRS configuration, as shown in FIG. 19 illustrating and example of DL-PTRS configuration.

At step 1820, the UE may receive and decode DCI and corresponding PDSCH by RNTI for high reliability service. The UE may also receive MCS index 15 for the corresponding PDSCH. Based on the PTRS configuration shown in FIG. 19, the UE may use time domain density "2" to receive coming PTRS.

Techniques are also described for performing an MCS table determination for retransmission and Bandwidth Parts (BWP) switching. For retransmission, if the initial transmission is based on the 256 QAM MCS table for normal reliability (eMBB) and the MCS index indicates the transport block is modulated by 256 QAM (e.g., MCS index is from 20 to 27), the UE may only receive an MCS index of a non-reserved entry when the retransmission of this transport block is based on high reliability MCS table (e.g., the UE will only receive MCS index from 0 to 28). It is noted that the UE may consider it as an error case if the UE receives MCS table indexes which are not in this range. In some aspects, UE will consider it as an error case if the coding rate is above a threshold (e.g., the highest coding rate 772/1024 for high reliability MCS table) for retransmission to maintain the same TB size as the initial transmission. In some aspects, UE will only apply the same MCS table for the same transport block for initial transmission and retransmission. It is noted that the UE may treat it as an error case if UE receives DCI that applied a different MCS table from the MCS table applied for initial transmission. How to distinguish which MCS table is applied is described further herein.

For BWP switching, the UE may use the high reliability MCS table when the UE receives a BWP switching indicator in DL DCI in a UE-specific search space if the MCS table configuration of a new BWP (i.e., the BWP the UE will switch to) is a high reliability MCS table. In some aspects, UE will use the high reliability MCS table when the UE receives a BWP switching indicator in DL DCI in UE-specific search space if the MCS table configuration of active BWP (i.e., the BWP on which the UE received the DCI) is a high reliability MCS table. Similarly, for cross carrier scheduling case, the UE may use the high reliability MCS table when the UE receives scheduling information for a scheduled cell in DL DCI in the UE-specific search space if the MCS table configuration of a scheduled cell (i.e., the cell which is indicated by CFI of DCI) is a high reliability MCS table. In some aspects, UE will use a high reliability MCS table when the UE receives scheduling information for a scheduled cell in DL DCI in the UE-specific search space if the MCS table configuration of scheduling cell (i.e., the cell on which the UE received the DCI) is a high reliability MCS table.

Using the techniques described above, various issues related to the simultaneous transmission of URLLC and eMBB based services are resolved. By resolving the above-described issues, the simultaneous use of URLLC and eMBB services can be performed by a UE. For example, the different latency and reliability requirement between the URLLC and eMBB services are accounted for, and separate parameters (e.g., PTRS parameters and/or beta offset parameters) are provided for the eMBB and URLLC services. An example of a method for performing such techniques is illustrated in FIG. 20.

Figure 20:
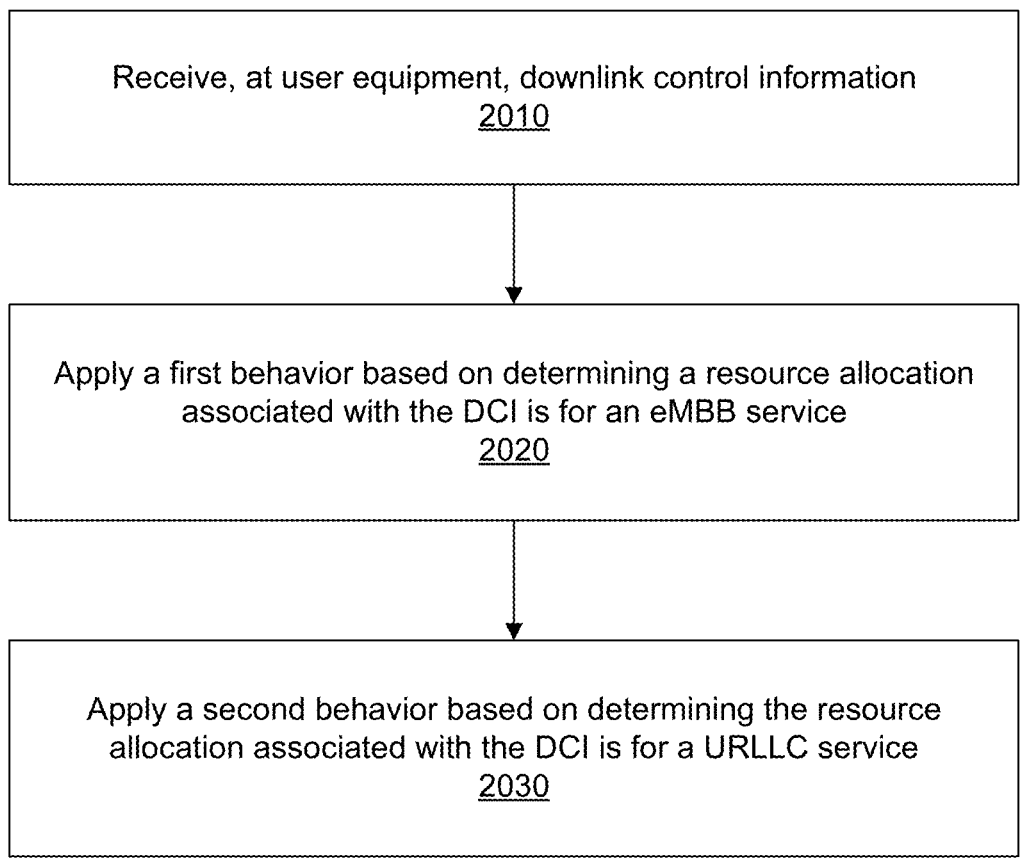
FIG. 20 is a flowchart illustrating an example of a method for handling simultaneous eMBB and URLLC transmission, in accordance with some examples provided herein.

FIG. 20 is a flowchart illustrating a method for handling simultaneous eMBB and URLLC transmission according to some aspects. At step 2010, the method comprises receiving, at user equipment, downlink control information (DCI).

The method further comprises, at step 2020, applying a first behavior based on determining a resource allocation associated with the DCI is for an eMBB service. Applying the first behavior may include applying a first PTRS parameter, applying a first beta offset, and/or generating at least a portion of a joint CSI report for the eMBB service. Any combination of these behaviors may be performed at step 2020.

The method further comprises, at step 2030, applying a second behavior based on determining the resource allocation associated with the DCI is for a URLLC service. Applying the second behavior includes applying a second PTRS parameter, applying a second beta offset, performing UCI multiplexing according to a PUCCH format, dropping UCI of a CSI report for the eMBB service, and/or generating at least a portion of the joint CSI report for the URLLC service. Any combination of these behaviors may be performed at step 2020.

In some examples, determining the resource allocation associated with the DCI is for the URLLC service includes determining that one or more CRC bits of the DCI are scrambled with a radio network temporary identifier (RNTI). In some aspects, determining the resource allocation associated with the DCI is for the URLLC service includes determining that a DCI format associated with the DCI has less bits than one or more DCI formats used for the eMBB service. In some aspects, determining the resource allocation associated with the DCI is for the URLLC service includes determining that a modulation coding scheme (MCS) table configured for at least one of a downlink channel or an uplink channel is an MCS table used for the URLLC service. In some aspects, determining the resource allocation associated with the DCI is for the URLLC service includes determining that the DCI was transmitted repetitively in a plurality of physical downlink control channel (PDCCH) monitoring occasions on a plurality of Control-ResourceSets (CORESETs) for the URLLC service. In some aspects, determining the resource allocation associated with the DCI is for the URLLC service includes determining that the DCI includes a physical downlink control channel (PDCCH) monitoring occasion having a periodicity of less than one slot.

In some implementations, the eMBB service and the URLLC service are used simultaneously by the user equipment. In some aspects, the first behavior is different than the second behavior. In one illustrative example, the first behavior can include applying the first PTRS parameter, and the second behavior can include applying the second PTRS parameter, which can be different than the first PTRS parameter. In some aspects, the first PTRS parameter and the second PTRS parameter include at least one of a time domain density or a frequency domain density.

In some examples, the first PTRS parameter is included in a first radio resource control (RRC) information element (IE), and the second PTRS parameter is included in a second RRC IE. In such examples, the first RRC IE is different than the second RRC IE. In some aspects, at least one of the first PTRS parameter or the second PTRS parameter is determined from the DCI.

In some implementations, the first PTRS parameter is determined using a first modulation coding scheme (MCS) index (e.g., the ptrs-MCS-urllc described above), and the second PTRS parameter is determined using a second MCS index (e.g., ptrs-MCS from FIG. 16). In some implementations, the second PTRS parameter is determined based on a predetermined time domain density. For example, the time domain density can be fixed for the URLLC service. In such implementations, a gNB can configure the predetermined time domain density for the URLLC service via a PTRS configuration, and the UE can apply the predetermined time domain density (without considering the MCS index received in the scheduling DCI) if the UE receives a DCI corresponding to high reliability service.

In some examples, the first PTRS parameter is determined by a first frequency resource allocation (e.g., a number of RBs as indicated by the NrofRB-URLLC parameter described above), and the second PTRS parameter is determined by a second frequency resource allocation (e.g., a different number of RBs, as indicated by the $N_{RB}$ parameter noted above). In some implementations, the second PTRS parameter is determined based on a predetermined frequency domain density. For example, the frequency domain density may be fixed for the URLLC service. In such implementations, a gNB may configure a predetermined frequency domain density for the URLLC service, and the UE can apply the predetermined frequency domain density (without considering scheduled RBs allocated in the scheduling DCI) if the UE receives a DCI corresponding to high reliability service, as described herein.

In some aspects, the second beta offset is different than the first beta offset. In some cases, the first beta offset and/or the second beta offset are indicated by the DCI (e.g., as shown in FIG. 8). In some examples, the first beta offset and the second beta offset are configured separately in a radio resource control (RRC) configuration. In some examples, the second beta offset is configured to achieve a BLER of 1e-5; the first beta offset can be configured to achieve a BLER of 1e-1. In some cases, when the joint CSI report is for the URLLC service, the second beta offset is applied to calculate uplink control information (UCI) bits of one or more CSI parameters for a channel quality indicator (CQI) table associated with the URLLC service.

In some implementations, the joint CSI report includes one or more CSI parameters for a first channel quality indicator (CQI) table with a first block error rate (BLER) of 1e-1 and one or more CSI parameters for a second CQI table with a second BLER of 1e-5. Uplink control information (UCI) bits of the one or more CSI parameters for the first CQI table can be calculated using the first beta offset, and UCI bits of the one or more CSI parameters for the second CQI table can be calculated using the second beta offset.

In some cases, the UCI multiplexing includes transmitting multiple UCI on a PUCCH resource. In some implementations, the PUCCH format is PUCCH format 2 (e.g., the PUCCH formats 3 and 4 may be restricted from being used for URLLC). In some examples, the UCI multiplexing is performed based on one or more PUCCH resources overlapping. The one or more PUCCH resources can be associated with at least one of a hybrid automatic repeat request acknowledgment (HARQ-ACK), at least one CSI report, or at least one scheduling request (SR) report. In some cases, as illustrated in Examples 3-1 and 3-2 above, the UCI for the eMBB service can be dropped when UCI bits are determined to exceed a capacity of a PUCCH resource. In some cases, dropping the UCI of the CSI report for the eMBB service can include dropping the portion of the joint CSI report for the eMBB service.

Figure 21:
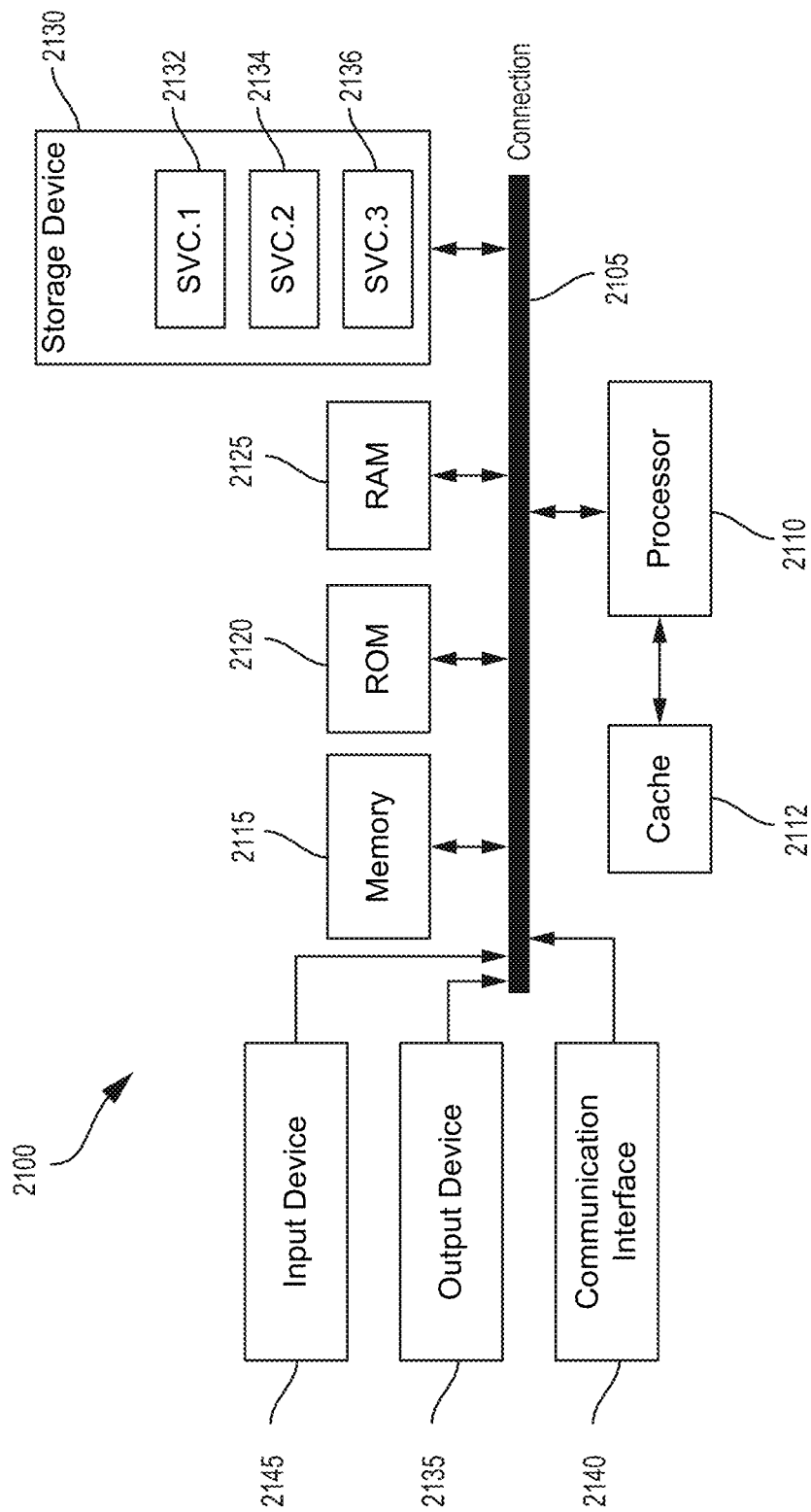
FIG. 21 is an example computing device architecture of an example computing device that can implement the various techniques described herein.

In some examples, the process 2000 may be performed by a computing device or apparatus, such as a computing device having the computing device architecture 2100 shown in FIG. 21. The computing device can include a UE or other suitable device. In some cases, the computing device or apparatus may include an input device, an output device, one or more processors implemented in circuitry, one or more microprocessors, one or more microcomputers, or other component that is configured to carry out the steps of process 1000. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display, a network interface configured to communicate and/or receive the data, any combination thereof, and/or other component(s). The network interface may be configured to communicate and/or receive telecommunications based data or other type of data.

Process 2000 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 21 illustrates an example computing device architecture 2100 of an example computing device which can implement the various techniques described herein. The components of computing device architecture 2100 are shown in electrical communication with each other using connection 2105, such as a bus. The example computing device architecture 2100 includes a processing unit (CPU or processor) 2110 and computing device connection 2105 that couples various computing device components including computing device memory 2115, such as read only memory (ROM) 2120 and random access memory (RAM) 2125, to processor 2110.

Computing device architecture 2100 can include a cache of high-speed memory connected directly with, in close proximity to, or integrated as part of processor 2110. Computing device architecture 2100 can copy data from memory 2115 and/or the storage device 2130 to cache 2112 for quick access by processor 2110. In this way, the cache can provide a performance boost that avoids processor 2110 delays while waiting for data. These and other modules can control or be configured to control processor 2110 to perform various actions. Other computing device memory 2115 may be available for use as well. Memory 2115 can include multiple different types of memory with different performance characteristics. Processor 2110 can include any general purpose processor and a hardware or software service, such as service 1 2132, service 2 2134, and service 3 2136 stored in storage device 2130, configured to control processor 2110 as well as a special-purpose processor where software instructions are incorporated into the processor design. Processor 2110 may be a self-contained system, containing multiple cores or processors, a bus, memory controller, cache, etc. A multi-core processor may be symmetric or asymmetric.

To enable user interaction with the computing device architecture 2100, input device 2145 can represent any number of input mechanisms, such as a microphone for speech, a touch-sensitive screen for gesture or graphical input, keyboard, mouse, motion input, speech and so forth. Output device 2135 can also be one or more of a number of output mechanisms known to those of skill in the art, such as a display, projector, television, speaker device, etc. In some instances, multimodal computing devices can enable a user to provide multiple types of input to communicate with computing device architecture 2100. Communications interface 2140 can generally govern and manage the user input and computing device output. There is no restriction on operating on any particular hardware arrangement and therefore the basic features here may easily be substituted for improved hardware or firmware arrangements as they are developed.

Storage device 2130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2125, read only memory (ROM) 2120, and hybrids thereof. Storage device 2130 can include services 2132, 2134, 2136 for controlling processor 2110. Other hardware or software modules are contemplated. Storage device 2130 can be connected to the computing device connection 2105. In one aspect, a hardware module that performs a particular function can include the software component stored in a computer-readable medium in connection with the necessary hardware components, such as processor 2110, connection 2105, output device 2135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of applying one or more behaviors based on one or more services, comprising:
   receiving, at user equipment, downlink control information (DCI);
   applying a first behavior based on determining that a resource allocation associated with the DCI is configured for an enhanced mobile broadband (eMBB) service, wherein:
      applying the first behavior includes generating a first channel state information (CSI) report for the eMBB service;
      the first CSI report includes one or more CSI parameters for a first channel quality indicator (CQI) table with a first block error rate (BLER) and one or more CSI parameters for a second CQI table with a second BLER;
      uplink control information (UCI) bits of the one or more CSI parameters for the first CQI table are calculated using a first beta offset; and
      UCI bits of the one or more CSI parameters for the second CQI table are calculated using a second beta offset; and
   applying a second behavior based on determining the resource allocation associated with the DCI is configured for an ultra-reliable low-latency communication (URLLC) service, wherein applying the second behavior includes generating a second CSI report for the URLLC service and performing UCI multiplexing for the second CSI report for the URLLC service on a first physical uplink control channel (PUCCH) resource by dropping the first CSI report for the eMBB service on a second PUCCH resource;
   wherein the first PUCCH resource and the second PUCCH resource are at least partially overlapped.

2. The method of claim 1, wherein the eMBB service and the URLLC service are used simultaneously by the user equipment.

3. The method of claim 1, wherein determining the resource allocation associated with the DCI is configured for the URLLC service includes determining that one or more cyclic redundancy check (CRC) bits of the DCI are scrambled with a radio network temporary identifier (RNTI).

4. The method of claim 1, wherein determining the resource allocation associated with the DCI is configured for the URLLC service includes determining that a DCI format associated with the DCI has less bits than one or more DCI formats used for the eMBB service.

5. The method of claim 1, wherein determining the resource allocation associated with the DCI is configured for the URLLC service includes determining that a modulation coding scheme (MCS) table configured for at least one of a downlink channel or an uplink channel is an MCS table used for the URLLC service.

6. The method of claim 1, wherein determining the resource allocation associated with the DCI is configured for the URLLC service includes determining that the DCI was transmitted repetitively in a plurality of physical downlink control channel (PDCCH) monitoring occasions on a plurality of ControlResourceSets (CORESETs) for the URLLC service.

7. The method of claim 1, wherein determining the resource allocation associated with the DCI is configured for the URLLC service includes determining that the DCI includes a physical downlink control channel (PDCCH) monitoring occasion having a periodicity of less than one slot.

8. The method of claim 1, wherein the UCI multiplexing includes transmitting multiple UCI on a PUCCH resource.

9. The method of claim 1, wherein a PUCCH format for the first PUCCH resource and the second PUCCH resource is PUCCH format 2.

10. The method of claim 1, wherein the first CSI report for the eMBB service is dropped when UCI bits are determined to exceed a capacity of the first PUCCH resource.

11. The method of claim 1, wherein dropping the first CSI report for the eMBB service includes dropping a portion of the first CSI report for the eMBB service.

12. An apparatus for applying one or more behaviors based on one or more services, comprising:
 a memory configured to store downlink control information (DCI); and
 a processor coupled to the memory and configured to:
  receive the DCI;
  apply a first behavior based on determining that a resource allocation associated with the DCI is configured for an enhanced mobile broadband (eMBB) service, wherein:
   applying the first behavior includes generating a first channel state information (CSI) report for the eMBB service;
   the first CSI report includes one or more CSI parameters for a first channel quality indicator (CQI) table with a first block error rate (BLER) and one or more CSI parameters for a second CQI table with a second BLER;
   uplink control information (UCI) bits of the one or more CSI parameters for the first CQI table are calculated using a first beta offset; and
   UCI bits of the one or more CSI parameters for the second CQI table are calculated using a second beta offset; and
  apply a second behavior based on determining the resource allocation associated with the DCI is configured for an ultra-reliable low-latency communication (URLLC) service, wherein applying the second behavior includes generating a second CSI report for the URLLC service and performing UCI multiplexing for the second CSI report for the URLLC service on a first physical uplink control channel (PUCCH) resource by dropping the first CSI report for the eMBB service on a second PUCCH resource;
 wherein the first PUCCH resource and the second PUCCH resource are at least partially overlapped.

13. The apparatus of claim 12, wherein the apparatus comprises a mobile device.

14. The apparatus of claim 12, wherein the first CSI report for the eMBB service is dropped when UCI bits are determined to exceed a capacity of the first PUCCH resource.

* * * * *